US012406159B2

(12) United States Patent
Ng et al.

(10) Patent No.: US 12,406,159 B2
(45) Date of Patent: Sep. 2, 2025

(54) APPARATUSES, COMPUTER-IMPLEMENTED METHODS, AND COMPUTER PROGRAM PRODUCTS FOR IMPROVED PRINT POSITION COMPENSATION

(71) Applicant: Hand Held Products, Inc., Charlotte, NC (US)

(72) Inventors: Cheng Khoon Ng, Singapore (SG); Heng Yew Lim, Singapore (SG); Shufeng Zheng, Singapore (SG); Jang Wei Chao, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 80 days.

(21) Appl. No.: 18/511,392

(22) Filed: Nov. 16, 2023

(65) Prior Publication Data

US 2024/0086664 A1  Mar. 14, 2024

Related U.S. Application Data

(63) Continuation of application No. 17/822,579, filed on Aug. 26, 2022, now Pat. No. 11,861,435, which is a
(Continued)

(51) Int. Cl.
  *B41J 25/308*  (2006.01)
  *G06K 15/00*   (2006.01)
  *G06K 15/16*   (2006.01)

(52) U.S. Cl.
  CPC ......... *G06K 15/408* (2013.01); *B41J 25/308* (2013.01); *G06K 15/16* (2013.01); *G06K 15/4065* (2013.01)

(58) Field of Classification Search
  CPC .. G06K 15/408; G06K 15/16; G06K 15/4065; B41J 25/308; B41J 2/2135;
  (Continued)

(56) References Cited

U.S. PATENT DOCUMENTS

| 3,971,044 A | 7/1976 | Findley et al. |
| 6,402,405 B1 | 6/2002 | Frodl et al. |

(Continued)

FOREIGN PATENT DOCUMENTS

| CN | 1749020 A | 3/2006 |
| CN | 1840338 A | 10/2006 |

(Continued)

OTHER PUBLICATIONS

English translation of JP Decision to Grant dated Sep. 26, 2023 for JP Application No. 2022127301, 2 page(s).
(Continued)

*Primary Examiner* — Huo Long Chen
(74) *Attorney, Agent, or Firm* — Alston & Bird LLP

(57) ABSTRACT

Embodiments of the disclosure provide for improved print position compensation, for example to improve accuracy of print job(s) performed by a printer. The print position compensation enables an offset of the time until printing occurs on a print media to account for changes and/or erroneous movement in a print media, such as due to slippage and/or other results of a force applied to the print media. Particular embodiments determine data values derived both for an output phase and a retraction phase of the printer's operation. Various embodiments generate a print position compensation based on sensor-based edge position distances determined during each of a media output phase and a media retraction phase. Alternatively or additionally various embodiments generate a print position compensation based on sensor-based media movement phase time-
(Continued)

stamp differentials determined during each of a media output phase and a media retraction phase.

21 Claims, 16 Drawing Sheets

Related U.S. Application Data continuation-in-part of application No. 17/408,161, filed on Aug. 20, 2021, now Pat. No. 11,461,604.

(58) Field of Classification Search
CPC .... B41J 3/4075; B41J 11/008; B41J 11/0095; B41J 29/393; B41J 2/125
See application file for complete search history.

(56) References Cited

U.S. PATENT DOCUMENTS

| | | | |
|---|---|---|---|
| 6,580,523 | B1 | 6/2003 | Yoshimoto et al. |
| 9,701,140 | B1* | 7/2017 | Alaganchetty ............ B41J 2/355 |
| 9,895,912 | B1 | 2/2018 | Izawa et al. |
| 11,461,604 | B1 | 10/2022 | Ng et al. |
| 2006/0012664 | A1* | 1/2006 | Jeong ........................ B41J 2/35 347/211 |
| 2010/0013903 | A1 | 1/2010 | Suzuki |
| 2015/0273896 | A1 | 10/2015 | Koizumi et al. |
| 2016/0052737 | A1* | 2/2016 | Kunihiro .................. B65H 3/44 271/227 |
| 2018/0075328 | A1 | 3/2018 | Wong et al. |
| 2020/0039773 | A1* | 2/2020 | Fujino ..................... B41J 13/103 |
| 2020/0145546 | A1 | 5/2020 | Alaganchetty et al. |

FOREIGN PATENT DOCUMENTS

| | | |
|---|---|---|
| CN | 105538911 A | 5/2016 |
| JP | 08-230266 A | 9/1996 |
| JP | 2000-127530 A | 5/2000 |
| JP | 2001-522742 A | 11/2001 |
| JP | 2002-255137 A | 9/2002 |
| JP | 2004-276396 A | 10/2004 |
| JP | 2006-240025 A | 9/2006 |
| JP | 2006-327130 A | 12/2006 |
| JP | 2010-116133 A | 5/2010 |
| JP | 2015-013398 A | 1/2015 |
| JP | 2016-026913 A | 2/2016 |
| JP | 2018-075808 A | 5/2018 |
| JP | 2023-182990 A | 12/2023 |

OTHER PUBLICATIONS

European search report Mailed on Jan. 2, 2023 for EP Application No. 22186241.
Examiner Interview Summary Record (PTOL-413) Mailed on Aug. 17, 2023 for U.S. Appl. No. 17/822,579, 1 page(s).
Final Rejection Mailed on May 11, 2023 for U.S. Appl. No. 17/822,579, 13 page(s).
JP Decision to Grant Mailed on Sep. 26, 2023 for JP Application No. 2022127301, 3 page(s).
Non-Final Rejection Mailed on Jan. 20, 2023 for U.S. Appl. No. 17/822,579.
Notice of Allowance and Fees Due (PTOL-85) Mailed on Aug. 17, 2023 for U.S. Appl. No. 17/822,579, 8 page(s).
Notice of Allowance and Fees Due (PTOL-85) Mailed on Aug. 30, 2023 for U.S. Appl. No. 17/822,579, 5 page(s).
Notice of Allowance and Fees Due (PTOL-85) Mailed on May 26, 2022 for U.S. Appl. No. 17/408,161.
Notice of Allowance and Fees Due (PTOL-85) Mailed on Nov. 9, 2023 for U.S. Appl. No. 17/822,579, 2 page(s).
EP Office Action Mailed on Nov. 21, 2024 for EP Application No. 22186241, 7 page(s).
English Translation of JP Notice of Allowance, including Search Report dated Apr. 1, 2025 for JP Application No. 2023182990, 2 page(s).
JP Notice of Allowance, including Search Report Mailed on Apr. 1, 2025 for JP Application No. 2023182990, 3 page(s).
English Translation of JP Office Action dated Dec. 3, 2024 for JP Application No. 2023182990, 3 page(s).
JP Office Action Mailed on Dec. 3, 2024 for JP Application No. 2023182990, 3 page(s).
U.S. Appl. No. 17/822,579, filed Aug. 26, 2022, U.S. Pat. No. 11,861,435, Allowed.
U.S. Appl. No. 17/408,161, filed Aug. 20, 2021, U.S. Pat. No. 11,461,604, Issued.
CN Office Action Mailed on May 30, 2025 for CN Application No. 202210930298, 10 page(s).
English Translation of CN Office Action dated May 30, 2025 for CN Application No. 202210930298, 16 page(s).

\* cited by examiner

APPARATUSES, COMPUTER-IMPLEMENTED METHODS, AND COMPUTER PROGRAM PRODUCTS FOR IMPROVED PRINT POSITION COMPENSATION

CROSS-REFERENCE TO RELATED APPLICATIONS

This application is a continuation of U.S. application Ser. No. 17/822,579, entitled "APPARATUSES, COMPUTER-IMPLEMENTED METHODS, AND COMPUTER PROGRAM PRODUCTS FOR IMPROVED PRINT POSITION COMPENSATION," filed Aug. 26, 2022, which is a continuation of U.S. application Ser. No. 17/408,161, entitled "APPARATUSES, COMPUTER-IMPLEMENTED METHODS, AND COMPUTER PROGRAM PRODUCTS FOR IMPROVED PRINT POSITION COMPENSATION," filed Aug. 20, 2021, now issued as U.S. Pat. No. 11,461,604, the contents of each of which are incorporated herein by reference in their entireties.

TECHNOLOGICAL FIELD

Embodiments of the present disclosure generally relate to improving printer operation, and specifically to improving print position compensation to improve the accuracy of print jobs and/or otherwise reduce erroneous print jobs and wasted resource expenditure associated therewith.

BACKGROUND

In various contexts, printers experience any of a number of error(s), circumstance(s), and/or the like that result in erroneous completion of a print job, for example by misprinting data at various locations along a print media rather than in proper locations at particular printable portions. Applicant has discovered problems with current implementations for compensating for such errors. Through applied effort, ingenuity, and innovation, Applicant has solved many of these identified problems by developing embodied in the present disclosure, which are described in detail below.

BRIEF SUMMARY

In general, embodiments of the present disclosure provided herein provide for improved generation and/or use of print position compensation. Other implementations for improved generation and/or use of print position compensation will be, or will become, apparent to one with skill in the art upon examination of the following figures and detailed description. It is intended that all such additional implementations be included within this description be within the scope of the disclosure, and be protected by the following claims.

In accordance with a first aspect of the disclosure, an example computer-implemented method is provided. The example computer-implemented method is provided for generating a print position compensation based at least in part on a first edge position distance and a second edge position distance. The computer-implemented method is executable by any of a myriad of computing device(s) embodied in hardware, software, firmware, and/or any combination thereof. In one example embodiment the computer-implemented method includes determining, via a sensor, a first edge position distance between a first edge and a print head during a media output phase. The example computer-implemented method further includes determining, via the sensor, a second edge position distance between the first edge and the print head during a media retraction phase. The example computer-implemented method further includes generating a print position compensation based at least in part on the first edge position distance and the second edge position distance.

Additionally or alternatively, in some example embodiments of the example computer-implemented method, the example computer-implemented method further includes initiating a print operation based at least in part on the print position compensation.

Additionally or alternatively, in some example embodiments of the example computer-implemented method, the first edge position distance comprises a first data value of a particular size, and the second edge position distance each comprise a second data value of the particular size.

Additionally or alternatively, in some example embodiments of the example computer-implemented method, generating the print position compensation comprises generating a differential edge position distance by subtracting the second edge position distance from the first edge position distance; and generating the print position compensation by dividing the differential edge position distance by two.

Additionally or alternatively, in some example embodiments of the example computer-implemented method, determining the first edge position distance includes detecting a leading edge of at least a printable portion of a print media via the sensor; tracking a distance traveled by the leading edge as a predetermined force is applied to the print media during the media output phase, the predetermined force associated with an objective distance between the sensor and the print head; and determining the first edge position distance based at least in part on the tracked distance traveled by the leading edge during the media output phase.

Additionally or alternatively, in some example embodiments of the example computer-implemented method, determining the second edge position distance includes detecting a leading edge of at least a printable portion of a print media via the sensor; tracking a distance traveled by the leading edge as a predetermined force is applied to the print media during the media retraction phase, the predetermined force associated with an objective distance between the sensor and the print head; and determining the second edge position distance based at least in part on the tracked distance traveled by the leading edge during the media retraction phase.

Additionally or alternatively, in some example embodiments of the example computer-implemented method, determining the second edge position distance includes detecting a trailing edge of at least a printable portion of a print media via the sensor; tracking a distance traveled by the trailing edge as a predetermined force is applied to the print media during the media retraction phase, the predetermined force associated with an objective distance between the sensor and the print head; and determining the second edge position distance based at least in part on the tracked distance traveled by the trailing edge during the media retraction phase.

Additionally or alternatively, in some example embodiments of the example computer-implemented method, the media output phase comprises a calibration print phase.

Additionally or alternatively, in some example embodiments of the example computer-implemented method, the media output phase comprises a previous print job phase.

Additionally or alternatively, in some example embodiments of the example computer-implemented method, the example computer-implemented method further includes executing a boundary check based at least in part on the print position compensation.

Additionally or alternatively, in some example embodiments of the example computer-implemented method, the example computer-implemented method further includes detecting occurrence of an idle state; and resetting the print position compensation in response to detecting occurrence of the idle state.

In accordance with a second aspect of the present disclosure, another computer-implemented method is provided. The second example computer-implemented method is provided for generating a print position compensation based at least in part on an output phase timestamp and a retraction phase timestamp. The second computer-implemented method is executable by any of a myriad of computing device(s) embodied in hardware, software, firmware, and/or any combination thereof. In one example embodiment the second example computer-implemented method includes determining, via a sensor and during a media output phase, an output phase timestamp differential based at least in part on a first edge associated with a first printable portion of a print media and a second edge associated with a second printable portion of the print media. The second example computer-implemented method further includes determining, via the sensor during a media retraction phase, a retraction phase timestamp differential based at least in part on a third edge associated with a third printable portion of the print media and a fourth edge associated with a fourth printable portion of the print media. The second example computer-implemented method further includes generating a print position compensation based at least in part on the output phase timestamp differential and the retraction phase timestamp differential.

Additionally or alternatively, in some example embodiments of the second example computer-implemented method, determining, via the sensor and during the media output phase, the output phase timestamp differential includes identifying, during the media output phase, a first event timestamp associated with a first edge detection event associated with the first edge; identifying, during the media output phase, a second event timestamp associated with a second edge detection event associated with the second edge; and determining the output phase timestamp differential based at least in part on the first event timestamp and the second event timestamp.

Additionally or alternatively, in some example embodiments of the second example computer-implemented method, determining, via the sensor and during the media output phase, the output phase timestamp differential includes detecting, via the sensor, a first edge detection event during the media output phase; determining, via the sensor, a first event timestamp associated with the first edge detection event; detecting, via the sensor, a second edge detection event during the media output phase; determining, via the sensor, a second event timestamp associated with the second edge detection event; and generating the output phase time stamp differential by subtracting the second event timestamp from the first event timestamp.

Additionally or alternatively, in some example embodiments of the second example computer-implemented method, determining, via the sensor and during the media retraction phase, the retraction phase timestamp differential includes identifying, during the media retraction phase, a first event timestamp associated with a first edge detection event associated with the first edge; identifying, during the media retraction phase, a second event timestamp associated with a second edge detection event associated with the second edge; and determining the retraction phase timestamp differential based at least in part on the first event timestamp and the second event timestamp.

Additionally or alternatively, in some example embodiments of the second example computer-implemented method, determining, via the sensor and during the media retraction phase, the retraction phase timestamp differential includes detecting, via the sensor, a first edge detection event during the media retraction phase; determining, via the sensor, a first event timestamp associated with the first edge detection event; detecting, via the sensor, a second edge detection event during the media retraction phase; determining, via the sensor, a second event timestamp associated with the second edge detection event; and generating the retraction phase timestamp differential by subtracting the second event timestamp from the first event timestamp.

Additionally or alternatively, in some example embodiments of the second example computer-implemented method, generating the print position compensation includes generating a timestamp-based distance value by subtracting the retraction phase timestamp differential from the output phase timestamp differential; and generating the print position compensation by multiplying the timestamp-based distance value with a print speed.

Additionally or alternatively, in some example embodiments of the second example computer-implemented method, determining the retraction phase timestamp differential includes (A) repeatedly until the first edge of a first edge type is detected: progressing the print media by one dot line; determining sensor data corresponding to the sensor from an analog-to-digital converter associated with the sensor, determining whether the sensor data indicates the first edge of the first edge type; in a circumstance where the sensor data indicates the first edge of the first edge type: determining a first timestamp associated with detection of the first edge; storing the first timestamp associated with detection of the first edge; repeatedly until the second edge of the first edge type is detected: progressing the print media by one dot line; determining second sensor data corresponding to the sensor from the analog-to-digital converter associated with the sensor; determining whether the sensor data indicates the second edge of the first edge type; in a circumstance where the second sensor data indicates the second edge of the first edge type: determining a second timestamp associated with detection of the first edge; storing the second timestamp associated with detection of the second edge; and determining the retraction phase timestamp differential from the first timestamp associated with detection of the first edge and the second timestamp associated with detection of the second edge.

In accordance with a third aspect of the present disclosure, an apparatus is provided. The apparatus is provided for generating a print position compensation based at least in part on a first edge position distance and a second edge position distance. In one example embodiment, an example apparatus includes at least one processor and at least one memory having computer-coded instructions thereon that, in execution with the at least one processor, cause the apparatus to perform any one of the example computer-implemented methods described herein. In another example embodiment, an example apparatus includes means for performing each step of any one of the example computer-implemented methods as described herein.

In accordance with a fourth aspects of the present disclosure, a computer program product is provided. The computer program product is provided for generating a print position compensation based at least in part on a first edge position distance and a second edge position distance. In one example embodiments, an example computer program product includes at least one non-transitory computer-readable storage medium having computer program code stored thereon that, in execution with at least one processor, configures the computer program product for performing any one of the example computer-implemented methods described herein.

BRIEF DESCRIPTION OF THE DRAWINGS

Figure 1:
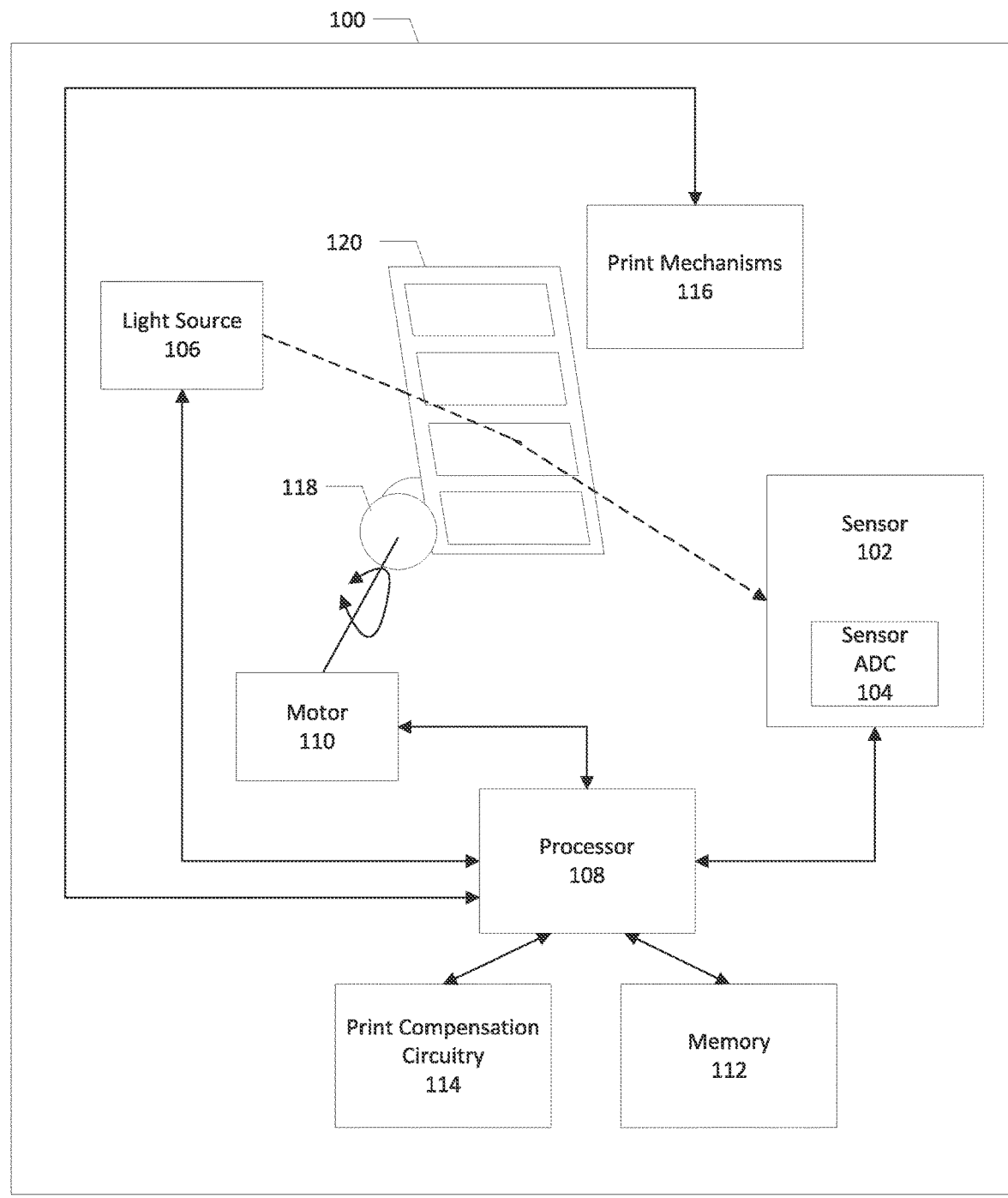
Figure 2:
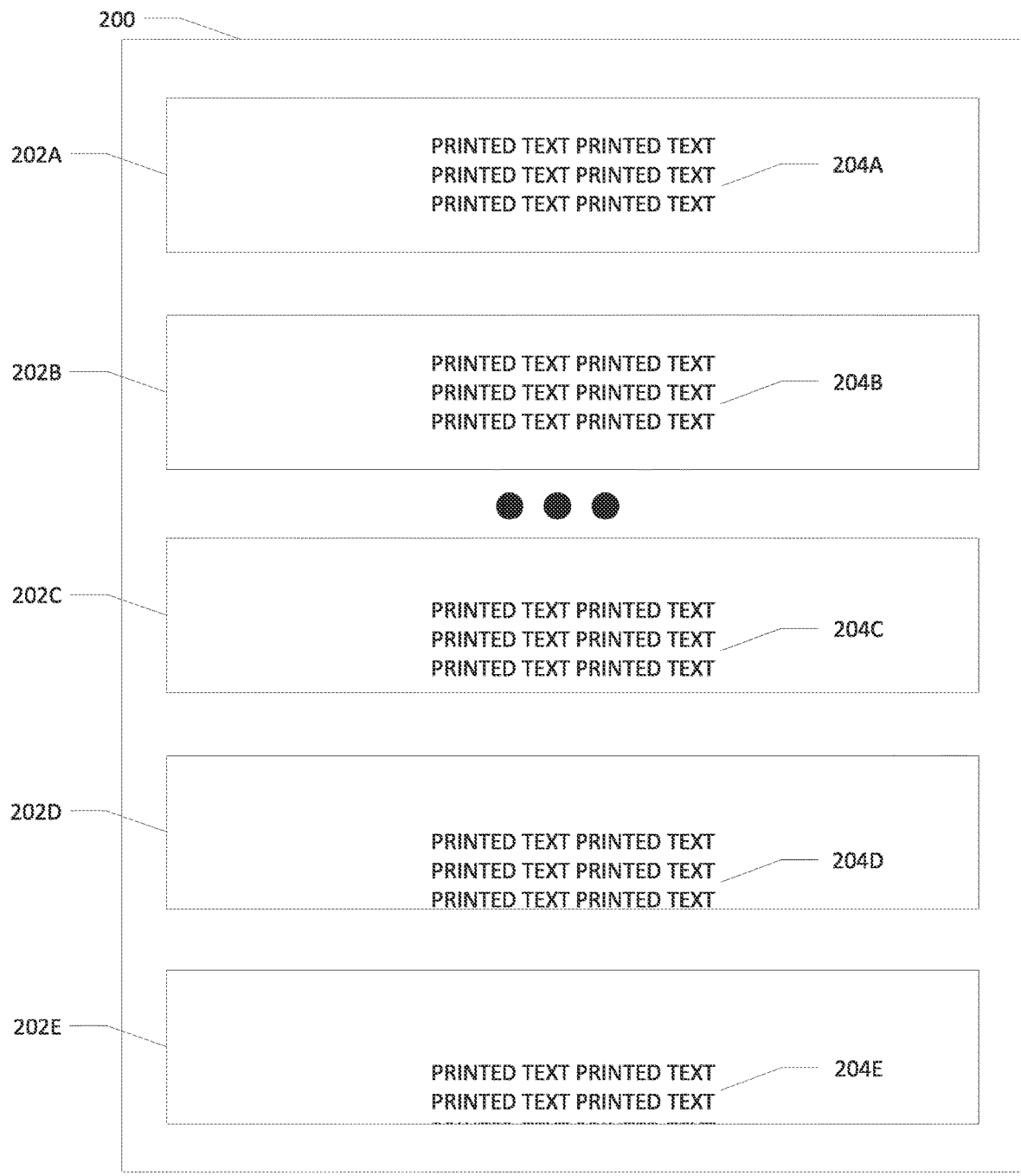
Figure 3:
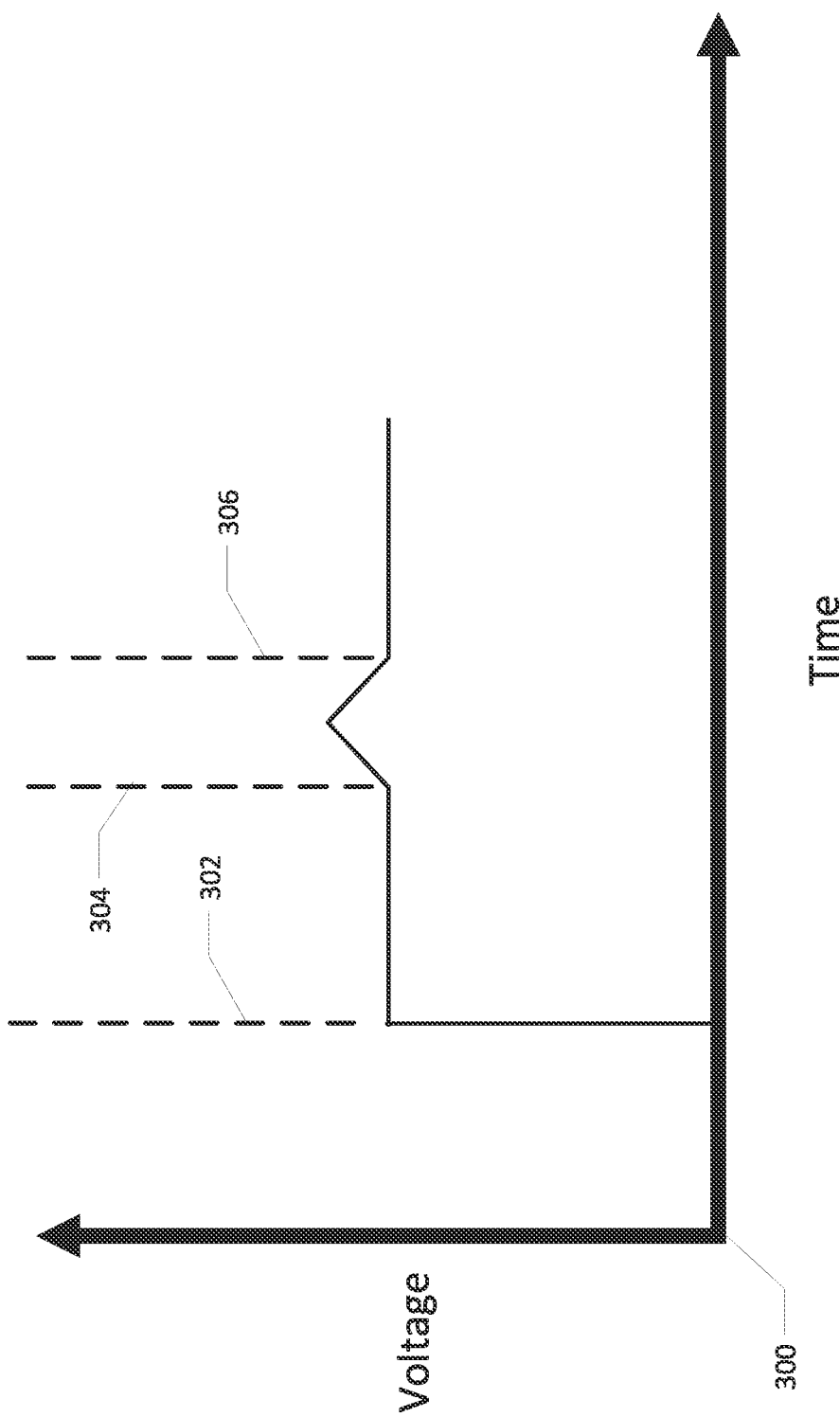
Figure 4:
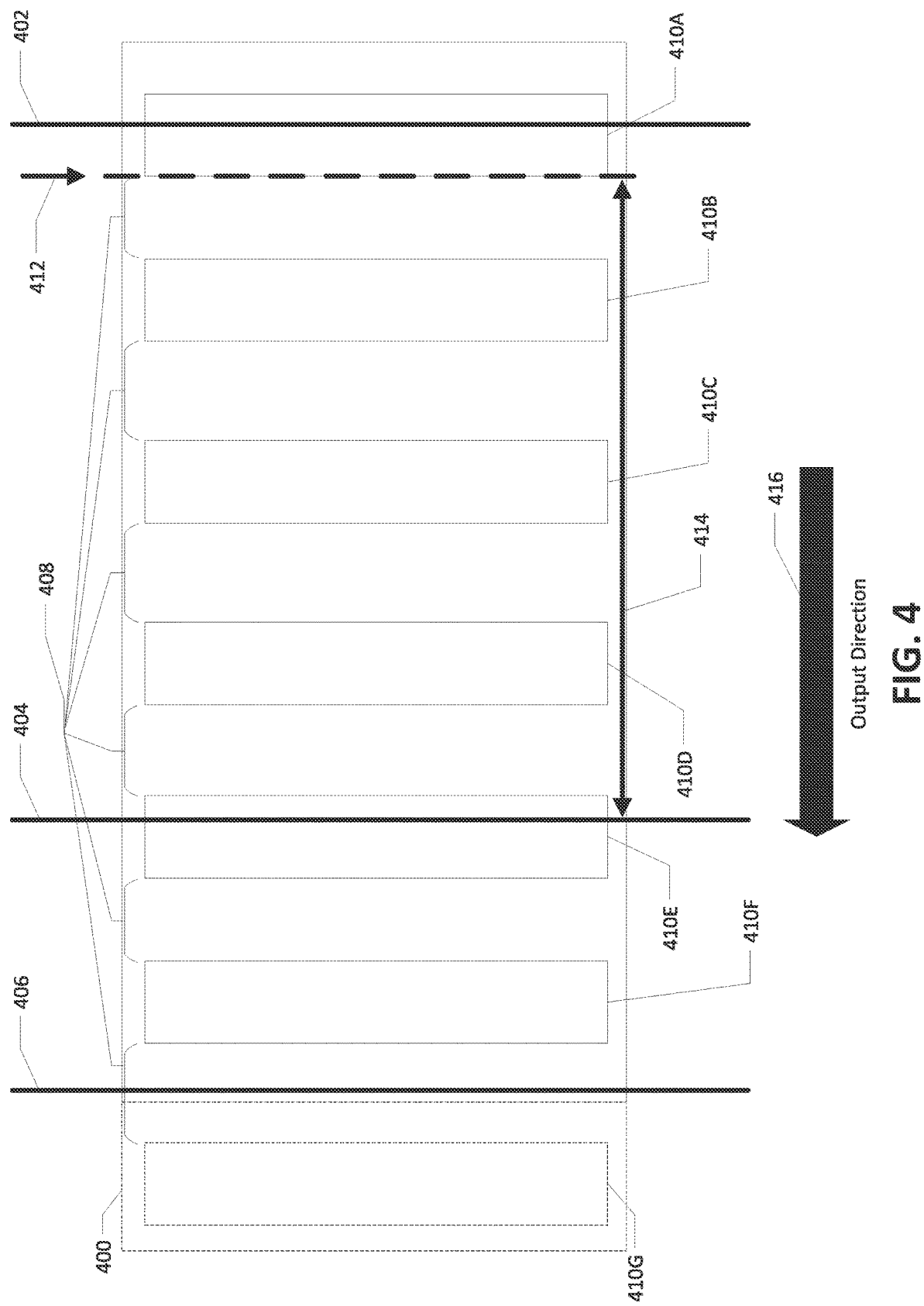
Figure 5:
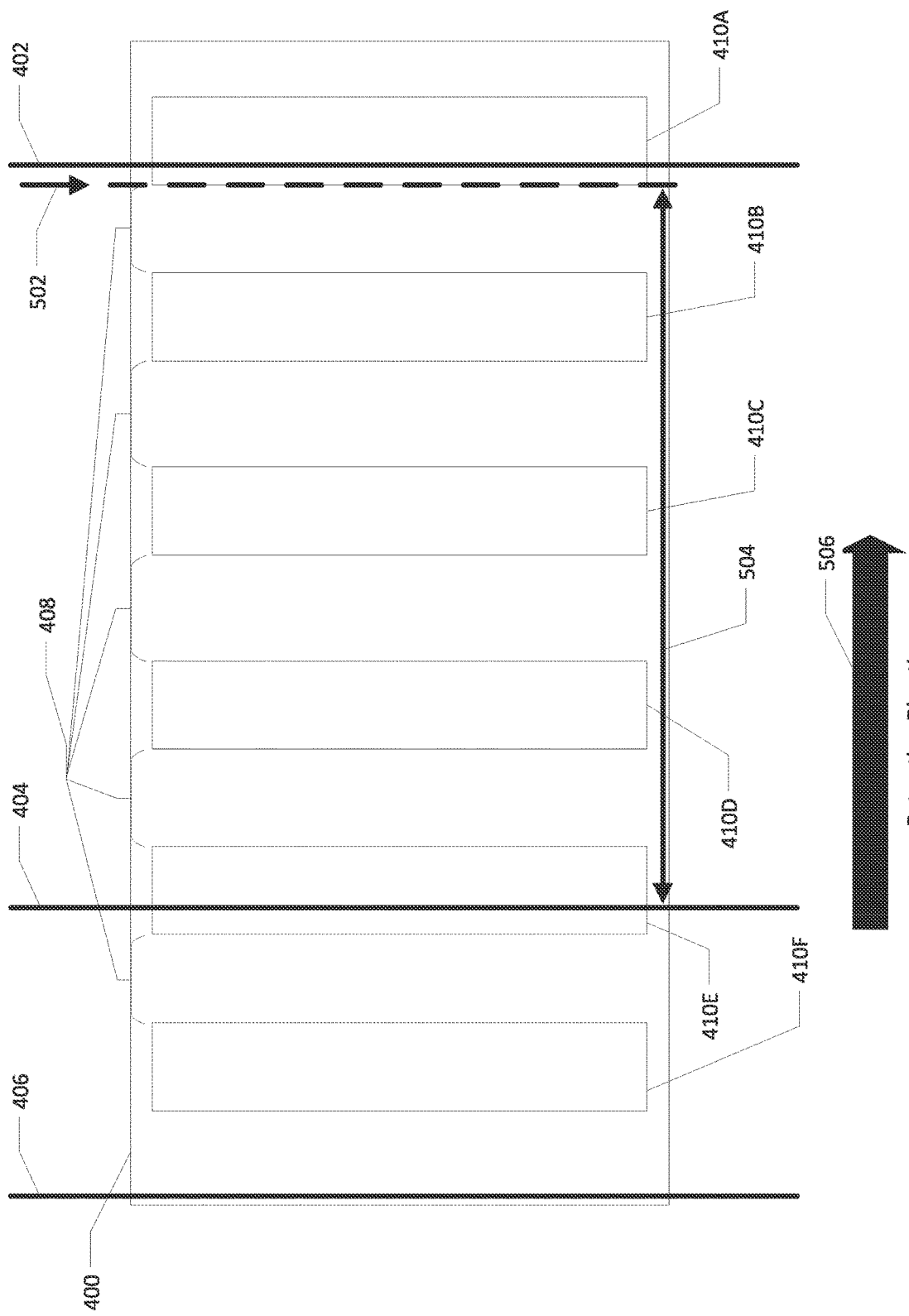
Figure 6:
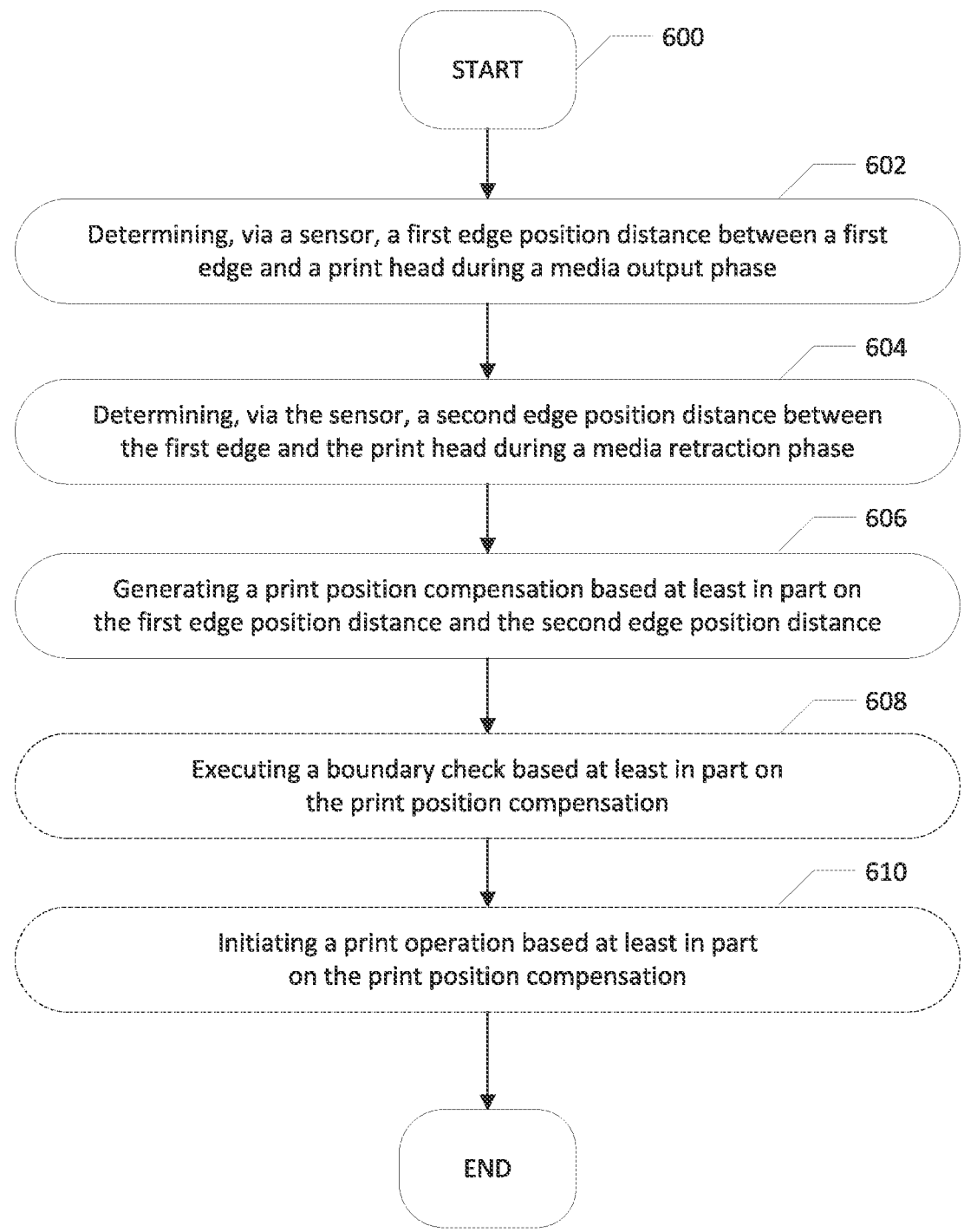
Figure 7:
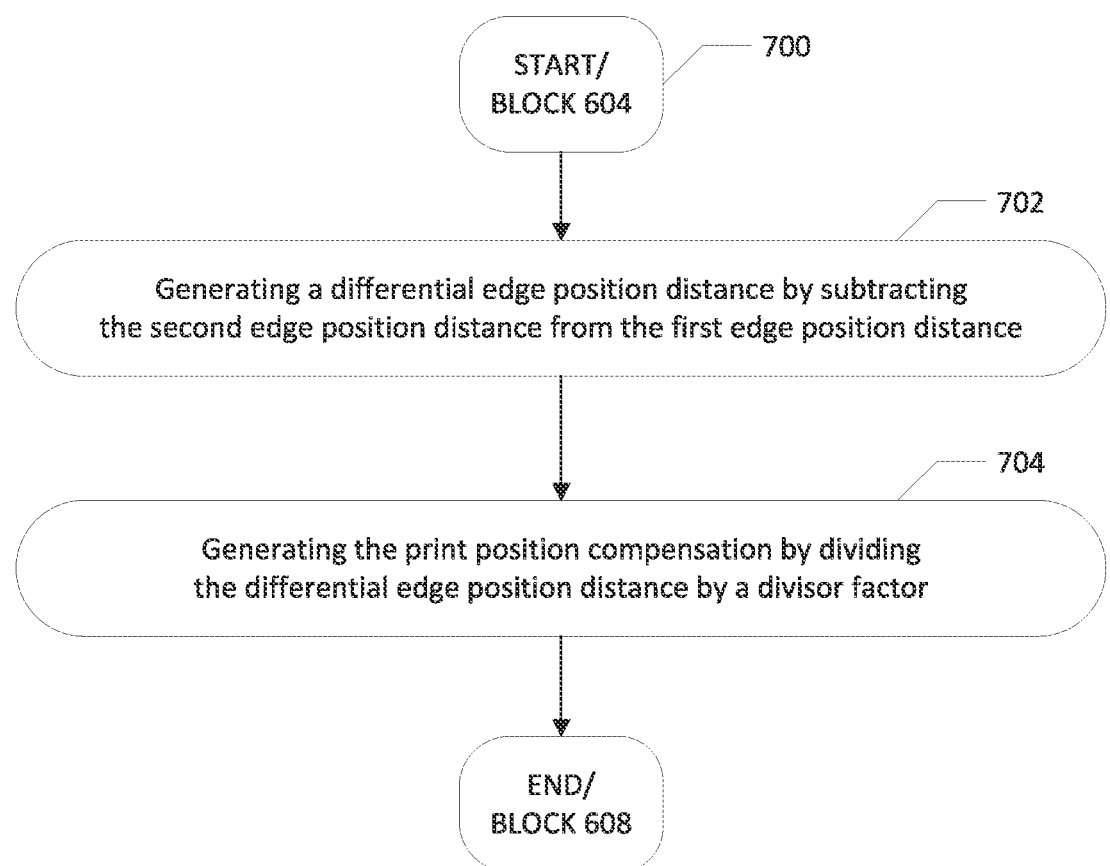
Figure 8:
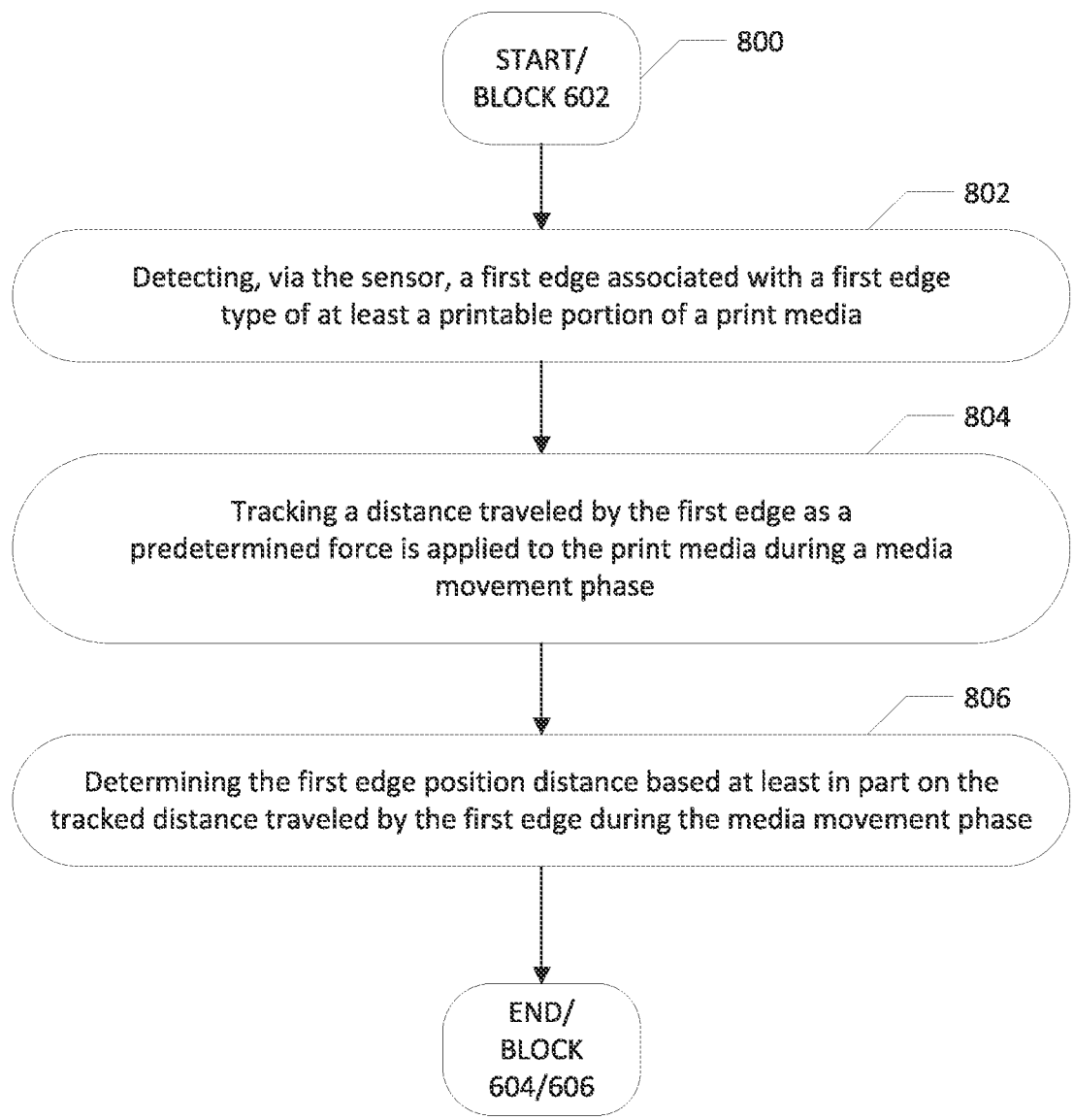
Figure 9:
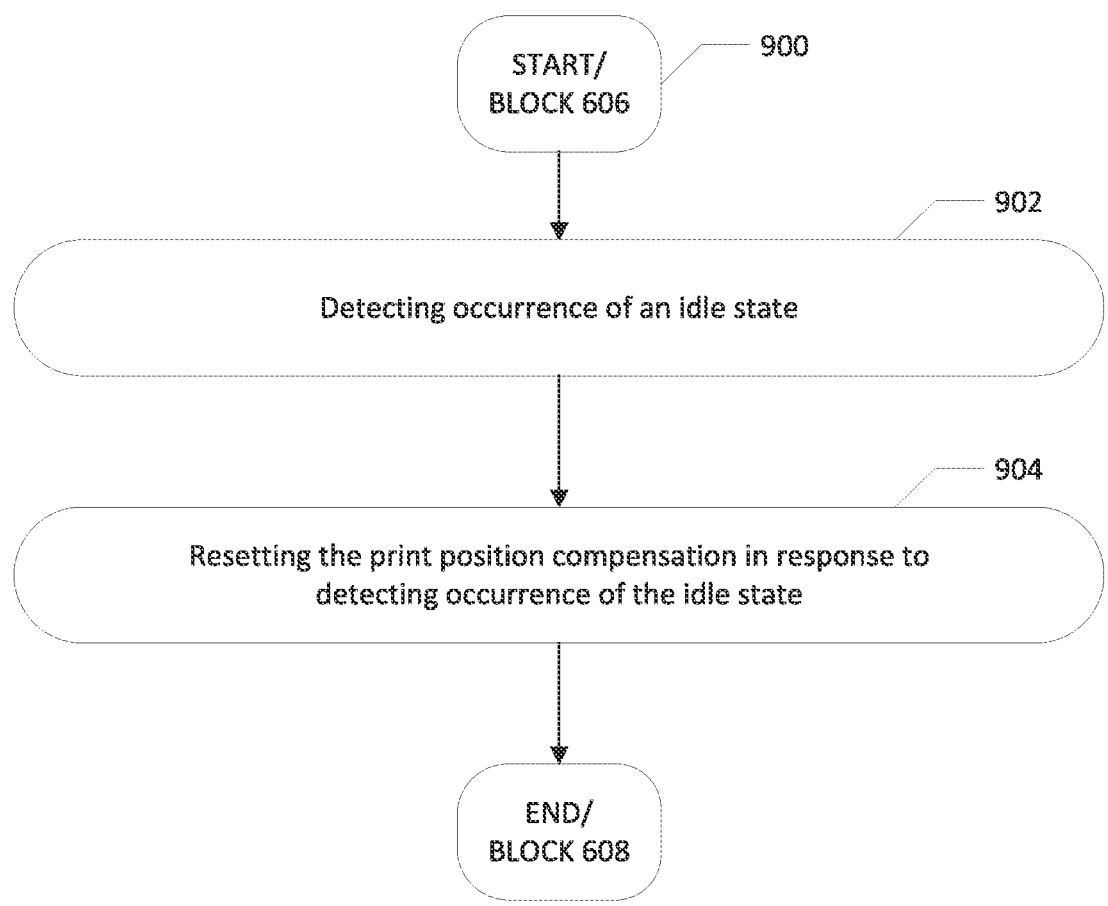
Figure 10:
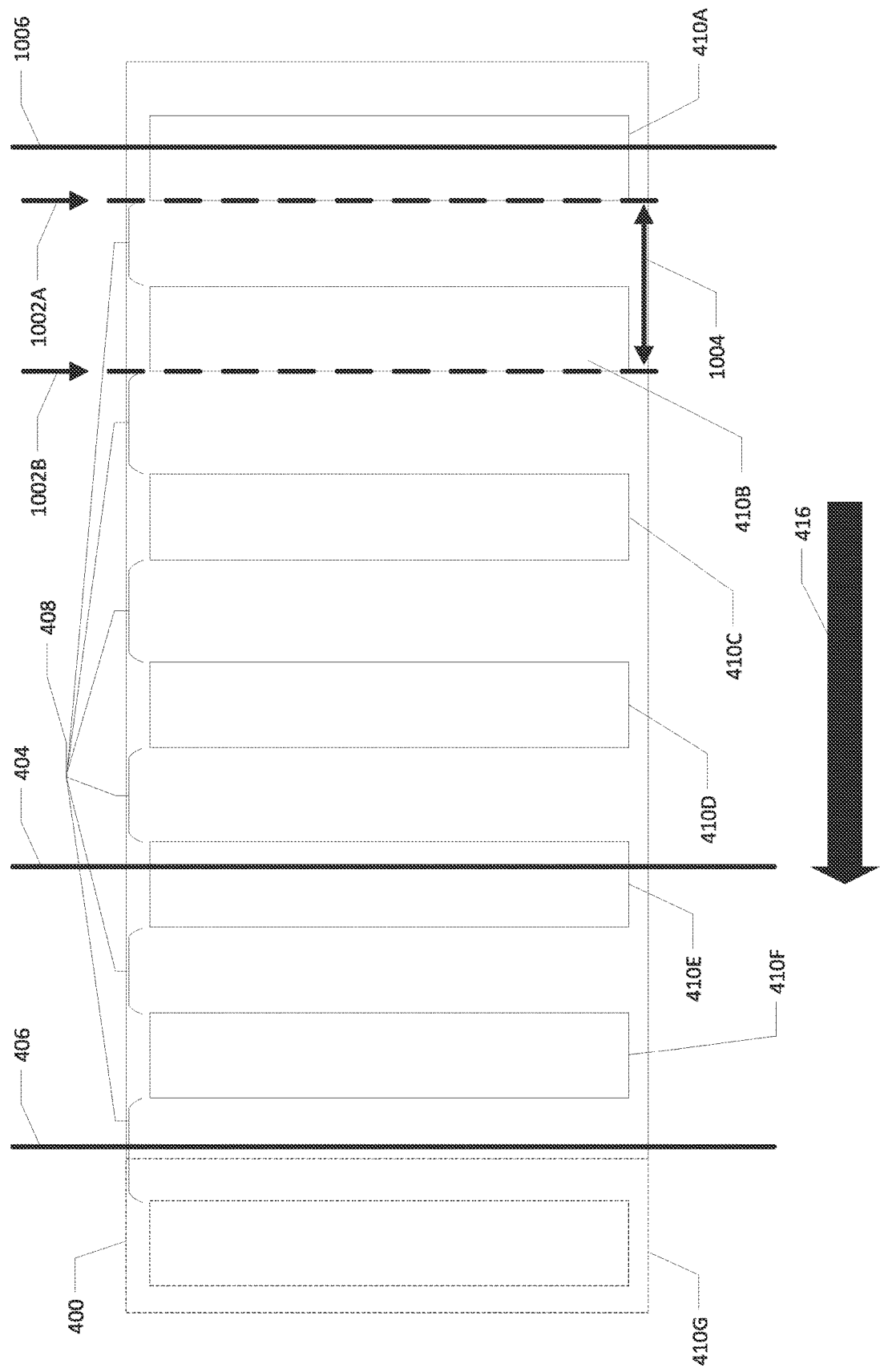
Figure 11:
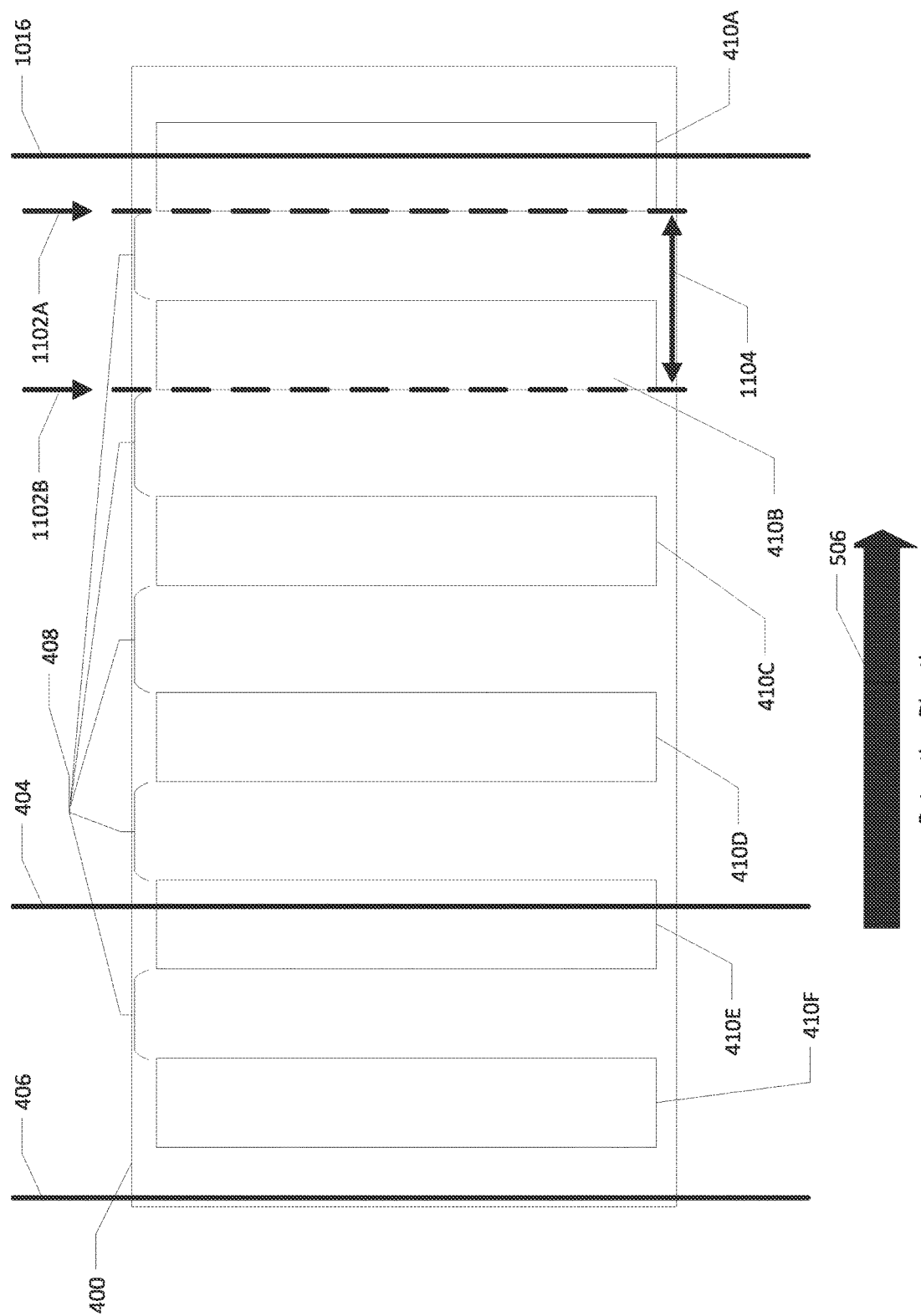
Figure 12:
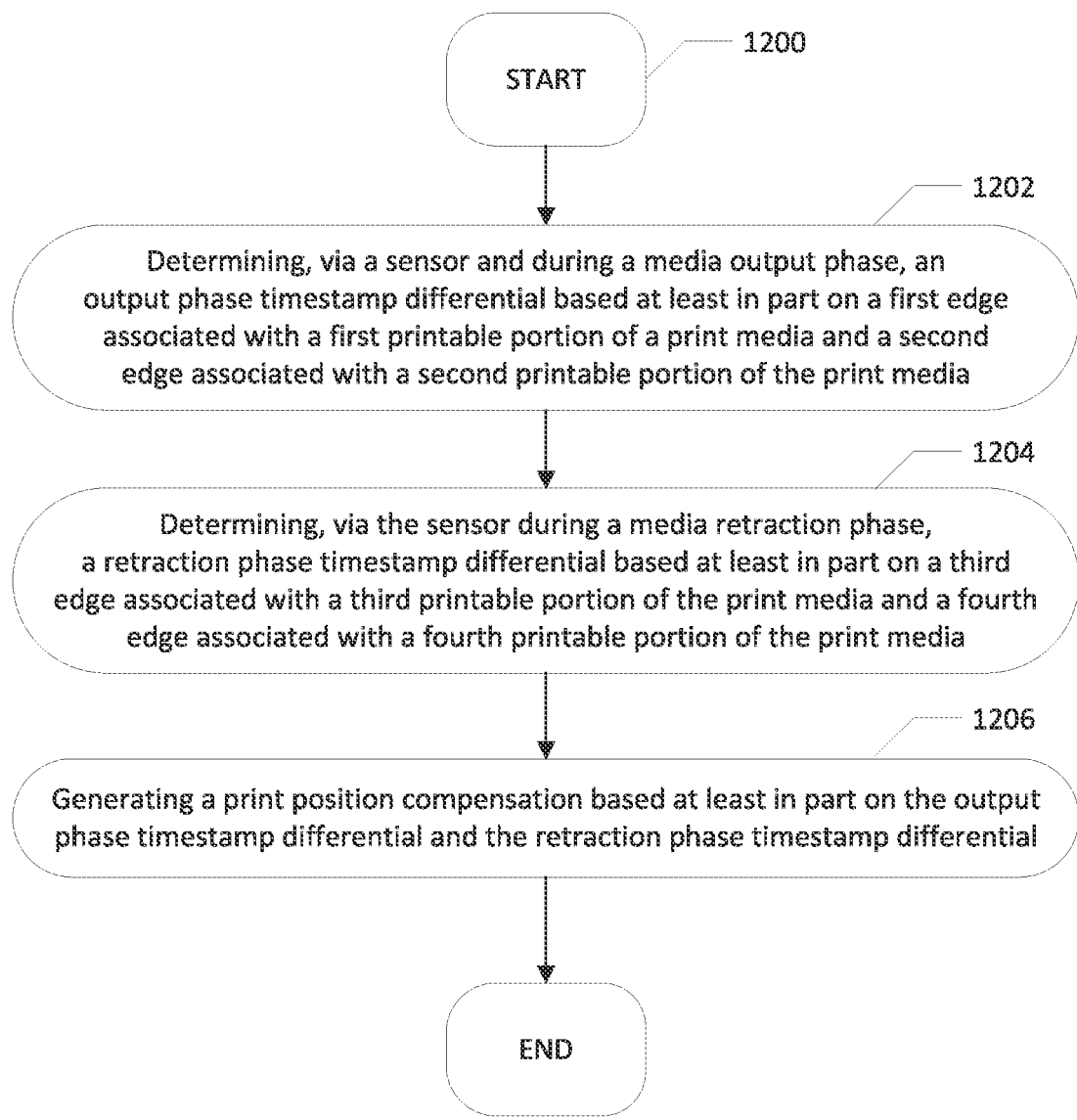
Figure 13:
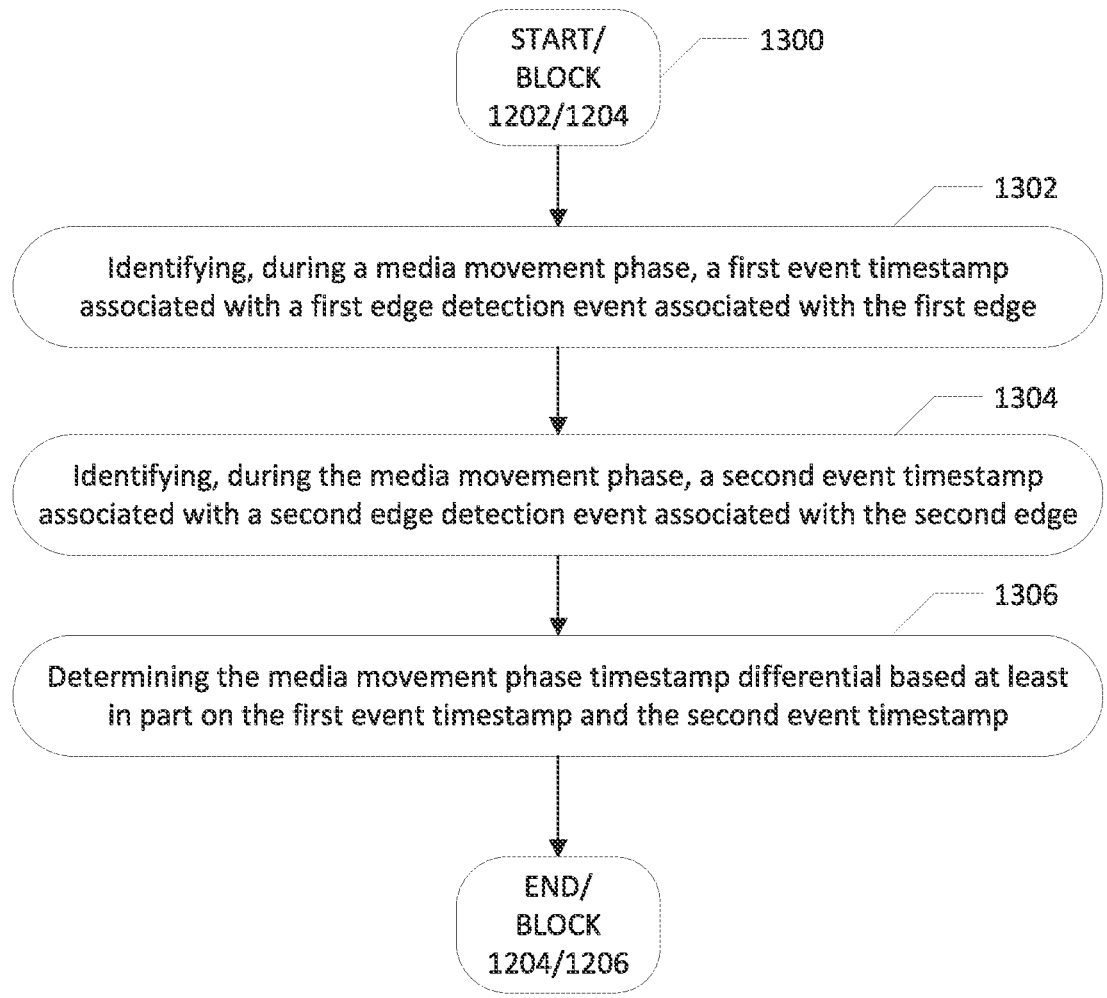
Figure 14:
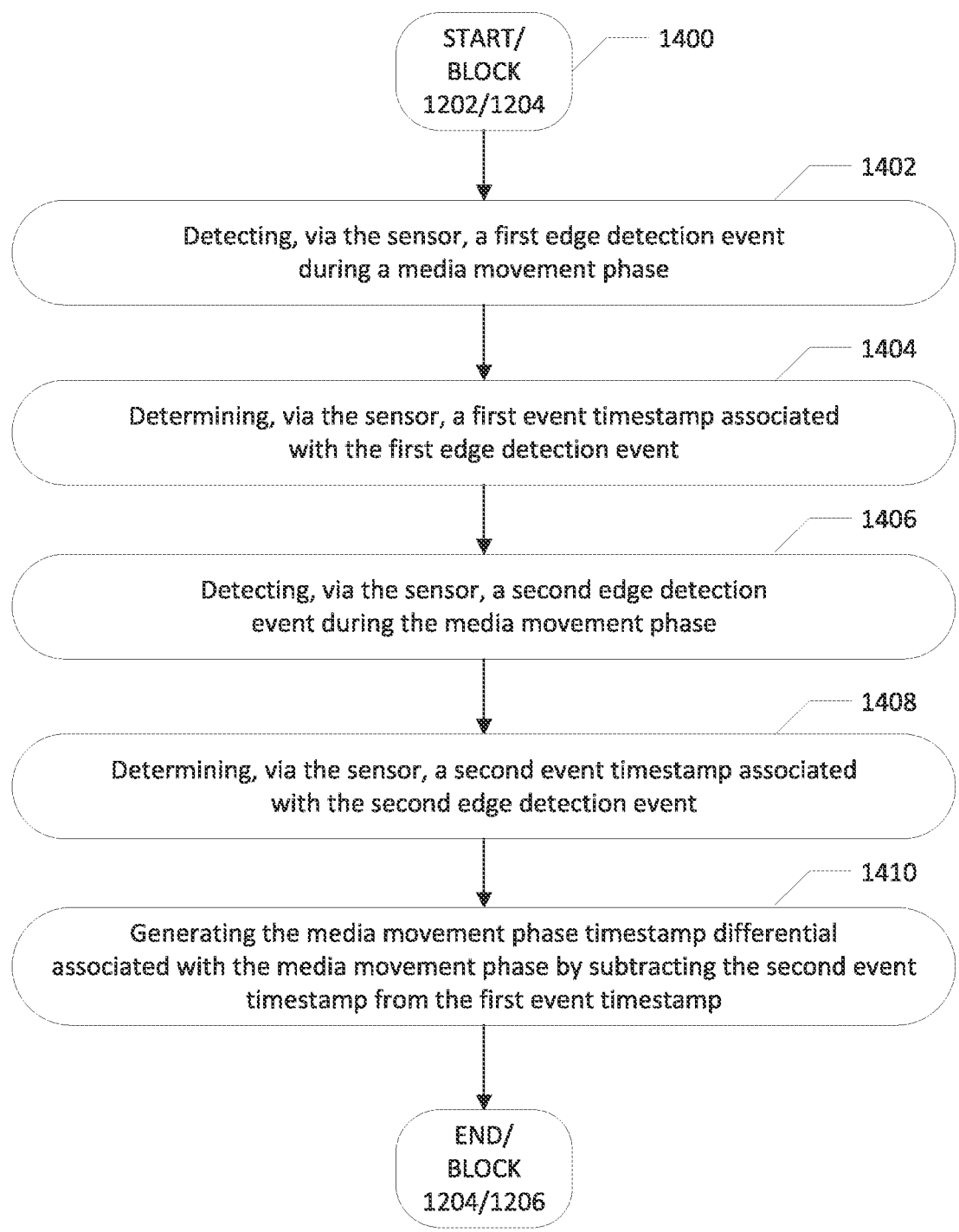
Figure 15:
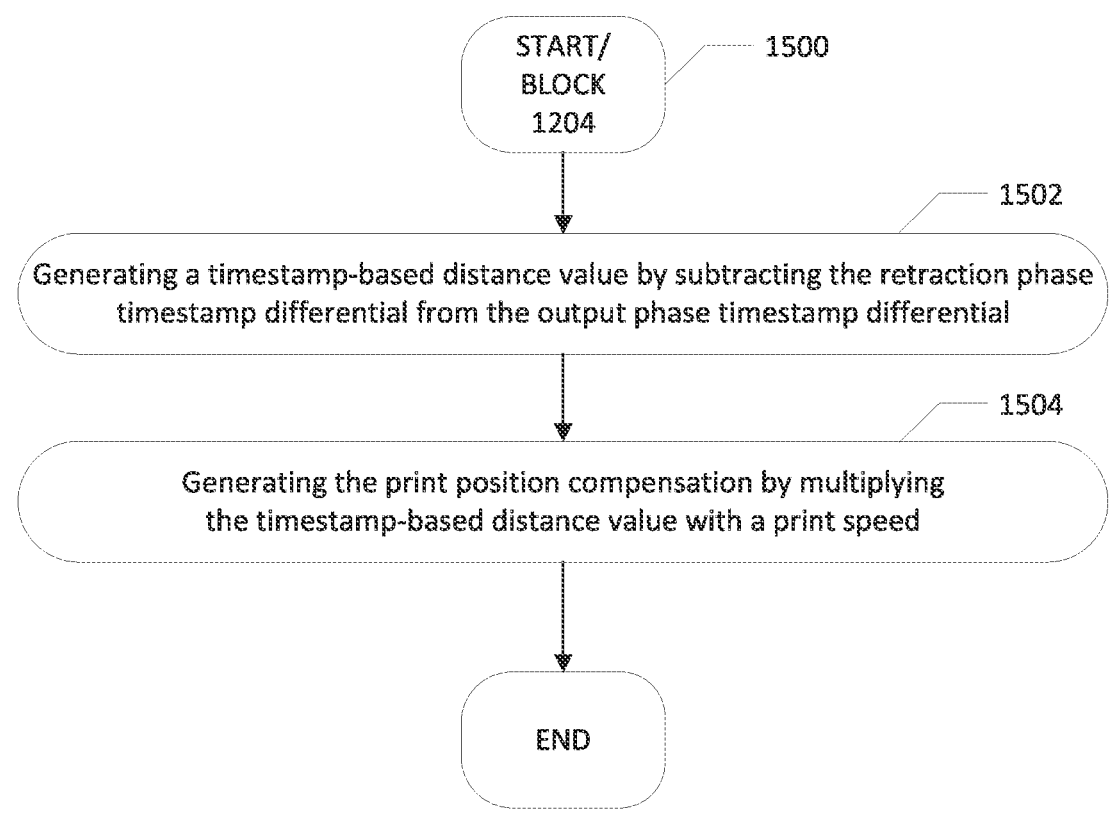
Figure 16:
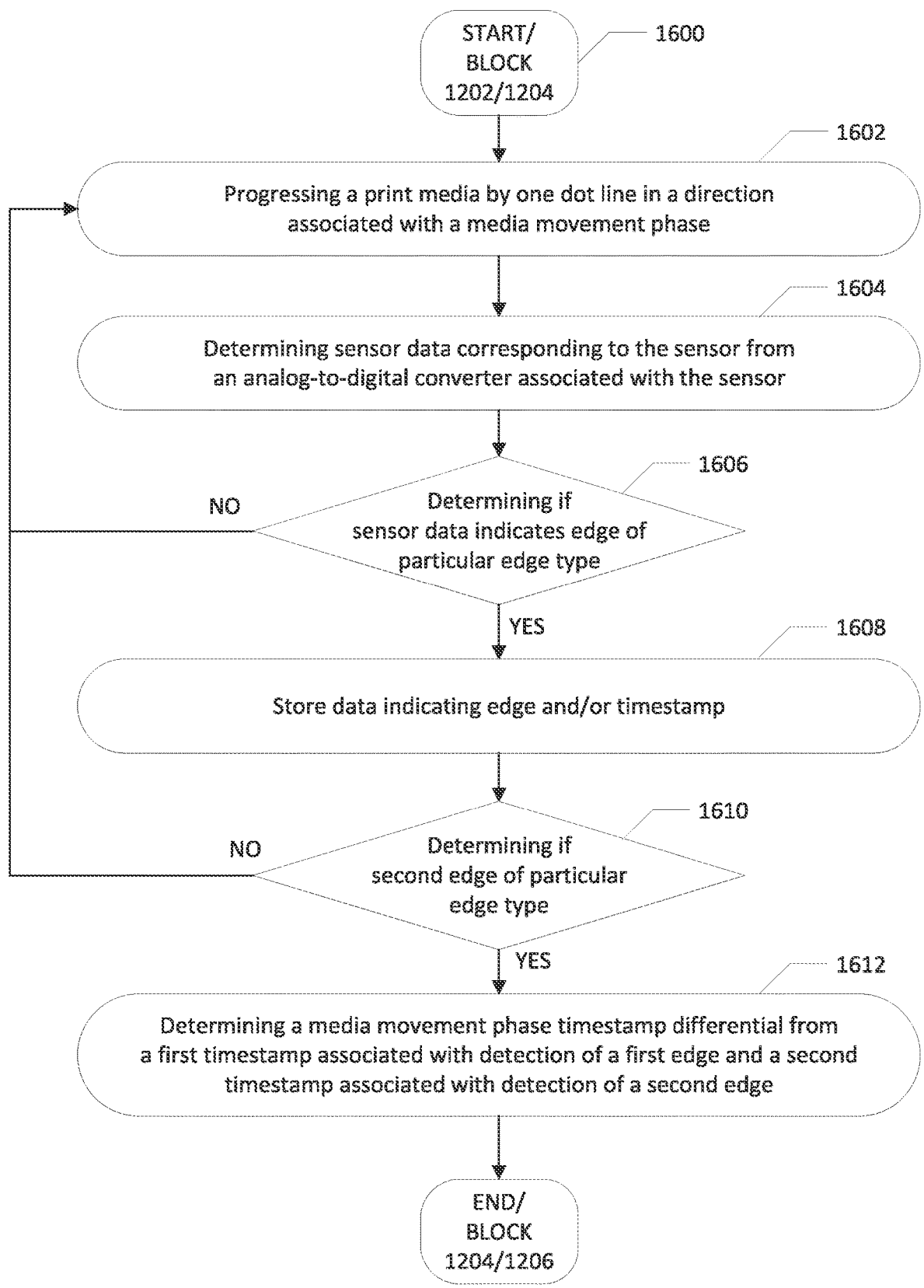

Having thus described the embodiments of the disclosure in general terms, reference now will be made to the accompanying drawings, which are not necessarily drawn to scale, and wherein:

FIG. 1 illustrates a block diagram of a printer apparatus that may be specially configured within which embodiments of the present disclosure may operate;

FIG. 2 illustrates an example visualization of printing errors affecting a print media, which may be improved in accordance with at least some example embodiments of the present disclosure;

FIG. 3 illustrates example sensor output in accordance with at least some example embodiments of the present disclosure;

FIG. 4 illustrates an example visualization of edge position distance determination during a media output phase, in accordance with at least some example embodiments of the present disclosure;

FIG. 5 illustrates an example visualization of edge position distance determination during a media retraction phase, in accordance with at least some example embodiments of the present disclosure;

FIG. 6 illustrates a flowchart depicting example operations of an example process for generating and/or utilizing a print position compensation based at least in part on one or more determined edge position distances, in accordance with at least some example embodiments of the present disclosure;

FIG. 7 illustrates a flowchart depicting example operations of an example process for generating a print position compensation based at least in part on a print position compensation and a divisor factor, in accordance with at least some example embodiments of the present disclosure;

FIG. 8 illustrates a flowchart depicting example operations of an example process for determining an edge position distance based on a tracked distance travelled during a media movement phase, in accordance with at least some example embodiments of the present disclosure;

FIG. 9 illustrates a flowchart depicting example operations of an example process for resetting a print position compensation, in accordance with at least some example embodiments of the present disclosure;

FIG. 10 illustrates an example visualization of phase timestamp differential determination during a media output phase, in accordance with at least some example embodiments of the present disclosure;

FIG. 11 illustrates an example visualization of phase timestamp differential determination during a media retraction phase, in accordance with at least some example embodiments of the present disclosure;

FIG. 12 illustrates a flowchart depicting example operations of an example process for generating and/or utilizing a print position compensation based at least in part on one or more determined phase timestamp differentials, in accordance with at least some example embodiments of the present disclosure;

FIG. 13 illustrates a flowchart depicting example operations of an example process for determining a media movement phase timestamp differential associated with a particular media movement phase, in accordance with at least some example embodiments of the present disclosure;

FIG. 14 illustrates a flowchart depicting example operations of an example process for generating a media movement phase timestamp differential associated with a media movement phase, in accordance with at least some example embodiments of the present disclosure;

FIG. 15 illustrates a flowchart depicting example operations of an example process for generating a print position compensation based at least in part on a timestamp-based distance value, in accordance with at least some example embodiments of the present disclosure; and FIG. 16 illustrates a flowchart depicting example operations of an example process for determining a media movement phase timestamp differential based on edge and timestamp detection and storage via a sensor, in accordance with at least some example embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

It will be appreciated that the data types, data objects, and other data representations described herein may be embodied in any of a myriad of manners. For example, such data representations may be embodied by any of a myriad of primitive data types, custom object implementations, and/or the like, without deviating from the scope and spirit of the present disclosure.

Overview

Ensuring a printer continues to print at an expected location on a print media is one of many factors important to ensure the printer is functioning as intended. One aspect of ensuring the printer continues to print at an expected location on a print media is maintaining a print precision, which defines the position at which printing of data is to begin and/or end. In circumstances where a printer does begin to print at an incorrect location (e.g., too high or too low), the incorrectly printed portion of the printed media may become completely unusable. For example, in the context of label printing, printing at an incorrect location may cause a label on a print media to be printed incomplete, with one or more portion(s) of data missing, cut off, and/or the like. If the print media is incorrectly printed, the printer may have completely wasted processing resources and/or the like that were utilized to perform the print, as well as waste actual print media upon which the data is printed (e.g., in circumstances where the print media is not reusable).

One cause of a printer printing incorrectly positioned labels is due to slippage of the print media. The slippage may cause printing to begin at different locations for different labels on a print media based on an inconsistent force applied to a print media. For example, when label printers and/or other devices that utilized a roll of a print media, slippage may occur as the size of a print job increases. As the roll of print media is expended, the diameter of such a roll of print media decreases. A force is applied to the print media to pull the print media in the direction required for printing on labels thereon, and/or outputting the print media including the printed data.

As the roll of print media is manipulated by the force (e.g., a spring force pulling the print media roll for printing and output), changing dynamics of the print media may cause a shift in the print position. For example, on a new roll of print media, a pulling force may be applied that is sufficient to pull the print media when it is at its largest (e.g., highest diameter), heaviest, and/or the like. As the print job continues, the pulling force may similarly be applied to the continuously used roll of print media. The decreased and/or otherwise altered aspects of the used roll of print media (e.g., a decreased diameter) may cause the print position to become incorrect, causing labels to print with errors varying in severity. Often, printers do not have any mechanism that compensate for or otherwise manage this change in force.

Referring to FIG. 2, FIG. 2 illustrates incorrectly printed labels due to incorrect print precision. Specifically, FIG. 2 depicts an example print media 200 including printable portions 202A, 202B, 202C, 202D, and 202E. In one example context, each printable portion of the print media 200 corresponds to a label on a particular roll of labels. Each of the printable portions includes data printed on the particular printable portion. For example, printable portion 202A includes text data 204A, printable portion 202B includes text data 204B, printable portion 202C includes text data 204C, printable portion 202D includes text data 204D, and printable portion 202E includes text data 204E. The text data 204A-204E may be printed by a particular printer over the course of a particular print job, which may correspond to printing of any number of labels. For example, a printer may execute a print job of tens, hundreds, thousands, and/or more labels. In one example context, the printable portion 202A embodies a first label of a print job, and the printable portion 202A embodies a second label of a print job, whereas the printable portions 202C, 202D, and 202E may be tens, hundreds, or thousands of labels later in the print job. As the print job continues, the likelihood of errors in print position affecting said printers may increase, for example as the diameter of a roll of print media within the printer decreases due to output during printing. Additionally, the likelihood of errors in print position increases in circumstances where the printable portions of the print media are smaller in area.

Each of the printable portions includes text data printed thereon that is intended to be printed at a particular position in the printable portion. For example, the text data may be intended for printing centered on a corresponding printable portion, such that a margin is maintained on each side of the text data. As illustrated, the print position may drift over time as the print job continues. The print position begins to drift downward at the printing of the printable portion 202C. The print position drifts further downward at the printing of the printable portion 202D, and even further downward at the printing of the printable portion 202E such that at least a portion of the text is cut off. The drift in print position causes wasteful expenditure of computing resources used to print one or more printable portions that ultimately are unusable, such as the printable portions 202C, 202D, and/or 202E. Additionally, the materials of the printable portions 202C, 202D, and 202E are wasted and may need to be disposed of. At the end of a particularly long print job (e.g., printing tens, hundreds, thousands, or more, of labels), some or all of the resulting prints may be useless.

Embodiments of the present disclosure generate a print position compensation that is utilized to offset a change in print position (e.g., due to slippage resulting in drift) that occurs over time. In this regard, the print position compensation may represent an offset to be utilized during one or more print jobs to initiate printing at a corrected print position. The corrected print position may account for any drift that has occurred. By reducing and/or eliminating drift, embodiments of the present disclosure more accurately perform print jobs regardless of print job length, label size, and/or any other factors impacting drift of a print position. By performing print jobs more accurately, embodiments additionally reduce material waste that would otherwise result from failed and/or inaccurate prints due to such a print position drift.

Some embodiments of the present disclosure generate a print position compensation based at least in part on one or more distances and/or timestamps usable to generate a distance, where such determinations are performed during different media movement phases—such as a media output phase and a media retraction phase. For example, some embodiments determine edge position distances between an edge and a component of the printer where printing is to occur (e.g., a print head), and utilize such edge position distances to generate a print position compensation. Alternatively or additionally, some embodiments determine media movement phase timestamp differentials for a media output phase and a media retraction phase, and utilize such timestamp differentials to determine a print position compensation. Such distances and/or timestamps may be determinable using sensor(s) present in various printers. In this regard, legacy printers may be specially configured to perform such operations without requiring alternative and/or additional hardware. Similarly, new printers may be specially configured to perform such determinations without reconfiguration.

Definitions

The term "sensor" refers to hardware, software, firmware, and/or a combination thereof, that detects a presence of a print media, a gap between portions of a print media, a black mark, and/or other determinable aspect of a portion of a print media. Non-limiting examples of a sensor include a label stop sensor, a black mark sensor, a gap sensor, a slot sensor, and/or the like.

The term "print head" refers to a printer component embodied in hardware, software, and/or firmware that engages and/or otherwise interacts with a print media to print on the print media.

The term "print media" refers to a physical object including any number of area(s) upon which data is printed. Non-limiting examples of a print media include a label roll, a continuous paper feed, and any other feed of printable material.

The term "printable portion" refers to defined area(s) of a print media upon which data is to be printed. In some embodiments, a print media includes printable portion(s) embodying labels or other areas upon which data is to be printed, and non-printable portion(s) separating the printable portion(s), for example gaps between such printable portion(s).

The term "edge position distance" refers to a determined distance between a particular edge of a portion of a print media and a print head.

The term "media movement phase" refers to a state of operation of a printer during which a print media is manipulated via one or more applied force(s).

The term "media output phase" refers to a particular media movement phase during which a print media is manipulated in a first direction for outputting via the printer. Non-limiting examples of a media output phase include a phase during which a printer is printing on a print media to output the print media including such printed data, a phase during which a print media is fed through the printer to output the print media, and/or another phase in which the print media is output with or without printing.

The term "media retraction phase" refers to a particular media movement phase during which a print media is manipulated in a direction opposite the direction of the printer during output. Non-limiting examples of a media retraction phase include a phase during which a printer is retracting unprinted labels that have already passed a particular sensor, but have not been printed on during a print job.

The term "print position compensation" refers to electronically managed data representing an offset distance or time value at which printing is to begin. In one example context, a positive print position compensation indicates printing is to begin at a particular number of dot lines later than a determined or default position at which printing usually is to begin.

The term "print operation" refers to electronically driven instructions that cause a printer to initiate a print job phase for printing particular data onto a print media. The term "print job phase" refers to a state of a printer during which data is to be printed on a print media. The term "calibration print phase" refers to a particular print job phase during which particular data is printed on a print media for use in calibrating one or more configuration(s), setting value(s), and/or other aspect(s) of the printer. For example, in some example contexts, during a calibration print phase calibration data is printed on a print media to determine a default print position at which data is to begin printing on a print media.

The term "determinable step size" refers to electronically managed data representing a unit of measurement associated with adjusting a position of a print media. In some embodiments, a determinable step size represents a particular number of dot lines, where the number is determined directly or interpreted from other detected data from a sensor (e.g., timestamp data).

The term "differential edge position distance" refers to electronically managed data representing a distance difference between two edge position distances. In one example context, a differential edge position distance represents a difference between a first edge position distance associated with a first media movement phase (e.g., a media output phase) and a second edge position distance associated with a second media movement phase (e.g., a media retraction phase).

The term "edge" refers to a boundary location and/or area of a printable portion of a print media. In some embodiments, an edge is associated with a plurality of edges, each having a different "edge type." The term "edge type" refers to a determined classification and/or categorization of a particular edge based on the location of the edge with respect to the corresponding printable portion of the print media and/or a particular direction.

The term "leading edge" with respect to a printable portion of a print media refers to an area and/or location of the printable portion that first passes a sensor in a media output phase. The leading edge may similarly be referred to as a "front edge" of a printable portion of a print media, such as a label. In some embodiments, a leading edge is a non-limiting example of an edge type.

The term "trailing edge" with respect to a printable portion of a print media refers to an area and/or location of the printable portion that last passes a sensor in a media output phase. The trailing edge may similarly be referred to as a "back edge" of a printable portion of a print media, such as a label. In some embodiments, a trailing edge is a non-limiting example of an edge type.

The term "objective distance" with respect to two locations refers to electronically managed data representing a known distance between the two locations. When used with respect to particular components, an objective distance refers to electronically managed data representing a known distance between the location associated with each of the particular components.

The term "boundary check" refers to any number of algorithm(s), determination(s), and/or data-driven process(es) that indicate whether a print position identified for use in performing a print job falls within a printable portion of a print media. In some embodiments, a boundary check embodies a comparison between a print position compensation and a maximum allowable compensation.

The term "idle state" refers to a determined state of a printer indicating that the printer has not performed operations associated with a print job for a particular period of time.

The term "edge detection event" refers to electronically managed data captured by a sensor that represents the presence of an edge within the field of view captured by the sensor. A edge detection event is detectable by the sensor and/or processing circuitry associated with the sensor.

The term "event timestamp" refers to electronically managed data representing a time at which a particular event was detected.

The term "media movement phase timestamp differential" refers to electronically managed data representing a determined length of time between a first event and a second event each detected during a media movement phase.

The term "output phase timestamp differential" refers to a media movement phase timestamp differential determined based on a first event and a second event detected during a media output phase.

The term "retraction phase timestamp differential" refers to a media movement phase timestamp differential determined based on a first event and a second event detected during a media retraction phase.

The term "timestamp-based distance value" refers to electronically managed data representing a difference between the time one or more edge(s) were determined moving between a media output phase and a media retraction phase based at least in part on a determined difference between an output phase timestamp differential and a retraction phase timestamp differential.

The term "print speed" refers to electronically managed data representing a known and/or determined speed at which a print media of a printer is moved.

Example Apparatuses of the Disclosure

FIG. 1 illustrates a block diagram of a printer apparatus that may be specially configured within which embodiments of the present disclosure may operate. Specifically, FIG. 1 illustrates an example printer apparatus 100 that generates and/or utilizes a print position compensation in accordance with the present disclosure. For example the printer apparatus 100 in some embodiments is configured to perform printing operations based at least in part on a determined print position compensation as described herein to minimize or eliminate the effects of print position drift. As illustrated, the printer apparatus 100 includes a sensor 102, sensor ADC 104, light source 106, processor 108, memory 112, print compensation circuitry 114, and print mechanisms 116. The printer apparatus 100 further includes a platen roller 118, which manipulates at least print media 120. In this regard, it will be appreciated that the various components depicted and described with respect to the printer apparatus 100 manipulate the print media 120, and/or an associated roll of print media including at least print media 120, for printing data on portion(s) of such print media via the print mechanisms 116, and outputting the print media including such printed data.

The sensor 102 includes hardware, software, firmware, and/or a combination thereof, that aids in controlling movement of print media in the printer apparatus 100. In some embodiments, the sensor 102 embodies a label stop sensor, black mark sensor, or other photoelectric sensor that aids in controlling the print media, such as by providing data indicating detect edges, movement of edges, and/or the like. The sensor 102 may detect gaps between printable portions of a print media (e.g., gaps between labels), black marks in a continuous stock, slots in a continuous stock, and/or the like. Alternatively or additionally, the sensor 102 may generate and/or capture data that is sent to the processor 108 specially configured to perform such detecting based at least in part on the received data from the sensor 102. In some embodiments, the sensor includes a sensor ADC 104 that embodies an analog-to-digital converter. The sensor ADC 104 may generate and/or output digital signals representing the data captured by the sensor 102. For example, the sensor 102 may detect and/or capture light rays projected from the light source 106 as it shines through the print media 120, such as during printing and/or retraction of the print media during execution of a print job. The light source 106 may embody one or more LED(s), laser(s), and/or device(s) that generate high-powered light in at least one direction. The sensor ADC 104 may output a digital representation of the light rays captured via the sensor 102.

The print media 120 may include a plurality of printable portions on which data is to be printed. In some embodiments, each printable portion embodies a label on which data is printed via the printer apparatus 100. Additionally, the print media 120 includes a gap between a trailing edge of a printable portion and a leading edge of the next printable portion. Such gaps and/or edges may be detectable via the sensor 102 as described herein.

The print mechanisms 116 include components embodied in hardware, software, and/or firmware, that facilitate printing of data onto the print media 120, feeding of print media out of the printer apparatus 100, and/or tearing or removal of one or more printable portions of the print media 120. In some embodiments, the print mechanisms 116 include a tear bar. The tear bar may be specially designed to enable tearing of printable portions from the print media 120 that have passed the tear bar, and/or peel printable portions from the print media 120. Additionally or alternatively, in some embodiments, the print mechanisms 116 include a print head. The print head may be specially configured to enable printing of data onto the print media 120. In some embodiments, the print head is controlled at least in part on instructions from the processor 108 and/or the like that cause the print head to print particular data at a particular location (e.g., a dot line), and/or at multiple locations along the print media 120. In some embodiments the print head is used to print particular data at a particular position on each printable portion of the print media 120. In this regard, the print head may be activated, for example based at least in part on instructions from the processor 108, to print data at particular locations based at least in part on a print position compensation.

In some embodiments, the processor 108 (and/or co-processor or any other processing circuitry assisting or otherwise associated with the processor) may be in communication with the memory 112 via a bus for passing information among components of the printer apparatus 100. In some embodiments, for example, the memory 112 is non-transitory and may include, for example, one or more volatile and/or non-volatile memories. In other words, for example, the memory 112 in some embodiments includes or embodies an electronic storage device (e.g., a computer readable storage medium). In some embodiments, the memory 112 is configured to store information, data, content, applications, instructions, or the like, for enabling the printer apparatus 100 to carry out various functions in accordance with example embodiments of the present disclosure.

The processor 108 may be embodied in a number of different ways. For example, in some example embodiments, the processor 108 includes one or more processing devices configured to perform independently. Additionally or alternatively, in some embodiments, the processor 108 includes one or more processor(s) configured in tandem via a bus to enable independent execution of instructions, pipelining, and/or multithreading. The use of the terms "processor" and "processing circuitry" may be understood to include a single core processor, a multi-core processor, multiple processors internal to the printer apparatus 100, and/or one or more remote or "cloud" processor(s) external to the printer apparatus 100.

In an example embodiment, the processor 108 may be configured to execute instructions stored in the memory 112 or otherwise accessible to the processor. Alternatively or additionally, the processor 108 in some embodiments is configured to execute hard-coded functionality. As such, whether configured by hardware or software methods, or by a combination thereof, the processor 108 may represent an entity (e.g., physically embodied in circuitry) capable of performing operations according to an embodiment of the present disclosure while configured accordingly. Alternatively or additionally, as another example in some example embodiments, when the processor 108 is embodied as an executor of software instructions, the instructions may specifically configure the processor 108 to perform the algorithms embodied in the specific operations described herein when such instructions are executed.

As one particular example, the processor 108 may be configured to perform various operations associated with controlling the printing process performed by the printer apparatus 100. In some embodiments, the processor 108 includes hardware, software, firmware, and/or a combination thereof, that controls and/or receives data from operation of the sensor 102. Additionally or alternatively, in some embodiments, the processor 108 includes hardware, software, firmware, and/or a combination thereof, that controls the motor 110, such as to cause movement of the print media 120 in accordance with a media movement phase (e.g., during printing, calibration, and/or the like). For example, in some embodiments the motor 110 is activatable advance (e.g., feed) the platen roller 118 such that more of the print media 120 is output. Additionally or alternatively, in some embodiments the motor 110 is activatable to reverse the platen roller 118, so as to retract the print media 120. Additionally or alternatively, in some embodiments, the processor 108 includes hardware, software, firmware, and/or a combination thereof, that controls activation of the light source 106 during one or more phase(s) to produce light rays that shine through a print media, such as the print media 120, during printing. Additionally or alternatively, in some embodiments, the processor 108 includes hardware, software, firmware, and/or a combination thereof, that controls the print mechanisms 116 to cause the print mechanisms 116 to print on, output, and/or otherwise engage or interact with the print media 120. Additionally or alternatively, in some embodiments, the processor 108 includes hardware, software, firmware, and/or a combination thereof, that interacts with the sensor 102, for example to receive as input the data captured by the sensor 102, to generate a print position compensation that compensates for drift in print position.

In some embodiments, the printer apparatus 100 is configurable (e.g., via the processor 108) to utilize any of a myriad of user-provided print media, such that the print media is not predefined by the printer apparatus 100 (e.g., a "mixed mode"). In some embodiments, the processor 108 operates using a command that is specific to a particular type of print media and/or configuration(s) of the printer apparatus 100.

The print compensation circuitry 114 includes hardware, software, firmware, and/or a combination thereof, that supports various functionality associated with generating and/or utilizing a print position compensation. The print position compensation offsets a particular drift in a print position. In some embodiments, the print compensation circuitry 114 includes hardware, software, firmware, and/or a combination thereof, that determines a first edge position distance during a media output phase and a second edge position distance during a media retraction phase. Additionally or alternatively, in some embodiments, the print compensation circuitry 114 includes hardware, software, firmware, and/or a combination thereof, that generates a print position compensation based at least in part on the first edge position distance and the second edge position distance.

Additionally or alternatively, in some embodiments, the print compensation circuitry 114 includes hardware, software, firmware, and/or a combination thereof, that determines an output phase timestamp differential associated with a media output phase. Additionally or alternatively, in some embodiments, the print compensation circuitry 114 includes hardware, software, firmware, and/or a combination thereof, that determines a retraction phase timestamp differential associated with a media retraction phase. Additionally or alternatively, in some embodiments, the print compensation circuitry 114 includes hardware, software, firmware, and/or a combination thereof, that generates a print position compensation based at least in part on the output phase timestamp differential and the retraction phase timestamp differential.

Additionally or alternatively, in some embodiments, the print compensation circuitry 114 includes hardware, software, firmware, and/or a combination thereof, that initiates a print operation based at least in part on a print position compensation. Additionally or alternatively, in some embodiments, the print compensation circuitry 114 includes hardware, software, firmware, and/or a combination thereof, that executes a boundary check based at least in part on a print position compensation.

It will be appreciated that, in some embodiments, print compensation circuitry 114 may include a separate processor, specially configured field programmable gate array (FPGA), or a specially programmed application specific integrated circuit (ASIC). Additionally or alternatively, in some embodiments, the print compensation circuitry 114 is combined with one or more other sets of circuitry. For example, in some embodiments, the print compensation circuitry 114 is combined with the processor 108, such that the two sets of circuitry are embodied in a single component. Similarly, in some embodiments, the print compensation circuitry 114 is combined such that the processor 108 performs one or more operations described above with respect to the print compensation circuitry 114.

FIG. 3 illustrates example sensor output in accordance with at least some example embodiments of the present disclosure. Specifically, FIG. 3 illustrates an example graph 300 of output from a sensor, such as the sensor 102. In some embodiments, the depicted values may represent analog values that are converted and/or output as digital values by a digital-to-analog converter associated with the corresponding sensor, for example the sensor ADC 104 associated with the sensor 102.

The graph 300 represents the voltage output of a sensor, such as the sensor 102, taken throughout a print job. When the job begins, the sensor is activated, for example to detect an edge of a printable portion of a print media (e.g., indicated by a black mark), a gap between printable portions of a print media, and/or the like. In this regard, as the print media in front of the sensor is moved, the sensor output begins to change at different times as the print media is moved. At timestamp 302, for example, the sensor is activated to at a baseline value associated with output from the sensor (e.g., during which a printable portion is in front of the sensor). At timestamp 304, for example, the sensor output begins to rise, for example due to light that is reflecting from a trailing edge of a printable portion of the print media. The sensor output reaches a peak and subsequently subsides up until the timestamp 306, for example based at least in part on light reflecting from a starting edge of a next printable portion, back to the baseline value.

In this regard, the time between timestamp 302 and timestamp 304 the sensor output indicates presence of a particular printable portion of a print media in front of the sensor (e.g., where a single label is traversed across the sensor). Further, at timestamp 304, the sensor output indicates presence of a trailing edge associated with a particular printable portion of a print media (e.g., where a single label has ended and subsequent data indicates a change in the print media in front of the sensor, indicating beginning of a gap). Further still, at timestamp 306, the sensor output indicates presence of a leading edge associated with a next printable portion of a print media (e.g., where a detected gap has ended and a baseline value is again output).

In this regard, it should be appreciated that the sensor output may be processed to determine one or more event(s) and/or timestamps at which such events occur. For example, based at least in part on a change in the sensor output from a baseline value to another value, an edge detection event may be detected associated with a trailing edge of a current printable portion. Additionally or alternatively, based at least in part on a change in the sensor output from a changing value back to a baseline value, an edge detection event may be detected associated with a leading edge of a new printable portion. Additionally or alternatively, upon detecting an edge, based at least in part on the sensor output at any given time, an edge detection event and/or an edge movement event (e.g., indicating movement of the edge) may be detected. It will be appreciated that the timestamp at which a particular event is detected may be identified, stored, and/or processed by the sensor itself and/or associated processing circuitry (e.g., a processor such as the processor 108).

It should be appreciated that this sensor output pattern, and/or the like, may repeat for any number of printable portions on a print media. In this regard, the sensor output may be repeated any number of times as the print media is moved (e.g., output or retracted) within the printer apparatus. Thus, the continuous sensor output may be utilized to detect how many printable portion(s) have passed the sensor, how long has passed since a particular edge of a printable portion passed the sensor, and/or the like. Additionally, it should be appreciated that the timestamps associated with one or more detected event(s), alone and/or in addition to predetermined and/or known data values such as the size of a label and/or a speed at which the printer moves a print media therein, may be used to determine one or more distances travelled by an edge, multiple edges, and/or the like.

Example Visualizations for Edge Position Distance Determinations

Having described example systems and apparatuses in accordance with the present disclosure, example visualizations of process(es) for edge position distance determination in accordance with the present disclosure will now be discussed. The edge determination distance determination process(es) may be utilized for any of a myriad of purposes, for example in generating a print position compensation. In some embodiments, the edge position distance determination is performed by a specially configured printer, for example the printer apparatus 100. It will be appreciated that the depicted distances are for illustration purposes and not to limit the scope and spirit of this disclosure.

FIG. 4 illustrates an example visualization of edge position distance determination during a media output phase, in accordance with at least some example embodiments of the present disclosure. Specifically, the example visualization depicts a print media 400 including a plurality of printable portions 410A-410G, each separated by a plurality of gaps 408. It will be appreciated that, in some embodiments, each of the plurality of gaps 408 is of the same size. The visualization further includes a location 402 at which a sensor is located, a location 404 at which a print head is located, and a location 406 at which a tear bar is located. The print media 400 may be maintained within a printer, for example embodied by the printer apparatus 100, that includes print mechanisms at the locations defined by the locations 402, 404, and 406 to facilitate printing on the print media 400. Additionally or alternatively, in other embodiments, any number of printable portions may fall between the location of the sensor 402 and the location of the tear bar 406 that have not been used in a previous print job.

FIG. 4 may depict the location of each of the plurality of printable portions 410A-410G at the end of a previous print job (e.g., a calibration print job or another previous print job). As illustrated, the printable portion 410G may be the last printable portion that was printed on during the previous print job. In this regard, the printable portion 410G extends past the location 406 tear bar, and may be torn off and/or otherwise removed from the print media 400 upon completion of the print job. The remaining plurality of printable portions 110A-110F may utilized for performing a subsequent print job involving one or more printable portion(s), for example as described with respect to FIGS. 4 and 5. In this regard, printer apparatus 100 may utilize the print position compensation at least for printing on each of the printable portions 410A-410F during the subsequent print job. In some such embodiments, the subsequent print job begins with a media retraction phase as depicted and described with respect to FIG. 5.

During the media output phase, the printer apparatus 100 manipulates the print media 400 to move the print media 400 in the output direction 416. The print media 400 may be moved in the output direction 416 during performance of a print job, for example a print of desired label data, a calibration print, and/or the like. In this regard, the print media 400 is moved towards the location 406 of the tear bar.

The sensor at location 402 may be used to track a location of an edge of a particular printable portion of the print media 400. For example, the sensor at location 402 may be used to detect each edge of the print positions 410A-410G as each of the edges passes by the sensor at location 402. In this regard, the sensor at location 402 may be used to track the location of each of the printable portions 410A-410G. For example, for any one of the printable portions 410A-410G, the sensor at location 402 may be used to detect the leading edge of the printable portion, and the location of this leading edge may be tracked based on a timestamp interval for which printing continues, and a predetermined or determinable speed at which the print media 400 is being output. The sensor at location 402 may similarly be used to detect and track the trailing edge of a printable portion, thereby defining a distance and/or area covered by the printable portion. It will be appreciated that the printer apparatus 100 may simultaneously track any number of printable portions of the print media 400, and/or particular edges thereof.

In some embodiments, the sensor may be used to track a position of a leading edge for a particular printable portion of the print media 400 closest to the sensor at location 402 at the completion of print job. As illustrated, the sensor may be used to determine and/or track the location 412 of the last edge that passed the sensor at location 402, specifically the leading edge associated with the printable portion 410A that is closest to and has passed the location 402 of the sensor. In some embodiments, the printer apparatus 100 utilizes the sensor at location 402 to determine the location 412 by detecting a timestamp at which the leading edge passed the sensor at location 402 and a timestamp where the print media 400 ceased moving (e.g., the print job was completed). The difference between the timestamp when the leading edge at location 412 passed the sensor and the timestamp when the print media 400 ceased movement may then be multiplied with a predetermined (e.g., static) or determinable speed to determine how far the leading edge has moved during that time (e.g., the distance between the location 412 and the location 402 of the sensor). Alternatively or additionally, in some embodiments, the leading edge of the printable portion 410A of the print media 400 may be determined at the location 412 based at least in part on a known width of each printable portion and/or output from the sensor at location 402.

In some embodiments, the leading edge of the printable portion 410A, illustrated at the location 412, is used to determine a first edge position distance 414 associated with a media output phase. For example, the leading edge of the printable portion 410A may be tracked to determine a first edge position distance 414 representing the distance between the location 412 and the location 404 of the print head. In this regard, the distance between the location 412 and the location 402 of the sensor is determined, and subtracted from a known, objective distance between the sensor at location 402 and the location of the print head 404. The known, objective distance between the sensor at location 402 and the location of the print head 404 may be statically maintained by the printer apparatus 100, for example in a memory, maintained by a processor, and/or the like, as a static value based at least in part on the configuration of the printer apparatus 100. In some embodiments, the timestamp between detection of the last edge that passed the sensor at location 402, or the last edge of a particular edge type, is utilized together with the timestamp at which the print media 400 ceased moving to determine the location 412, the distance between the location 412 and the sensor at location 402, and/or the distance between the location 412 and the location of the print head 404. In some embodiments, the sensor at location 402 may be utilized to track a number of dot lines as the print media 400 is moved (e.g., by a motor attached to a platen roller that controls movement of the print media 400). Alternatively or additionally, in some embodiments, the sensor is used to determine timestamp(s) for particular events, and generating the first edge position distance 414 based at least in part on such timestamps(s) and known data associated with speed at which the print media 400 is moved, a predetermined force applied, and/or the like. It should be appreciated that, in other embodiments, a trailing edge of a particular printable portion (e.g., the printable portion 410A) is tracked for use in generating the first edge position distance 414.

FIG. 5 illustrates an example visualization of edge position distance determination during a media retraction phase, in accordance with at least some example embodiments of the present disclosure. It will be appreciated that the media retraction phase may occur after and/or before the media output phase as described herein with respect to FIG. 4. For example, in some embodiments, the media retraction phase begins at the initiation of a new print job subsequent to completion of a previous print job. The previous print job may be a calibration print job or an actual print job with user-inputted data for printing. As described herein, the printable portion 410G as depicted and described may be printed for removal from the print media 400 during the previous print job. Accordingly, FIG. 5 is depicted with the printable portion 410G removed.

In some embodiments, the printer apparatus 100 maintains the location of each of the printable portions remaining (e.g., not printed on during a previous print job). For example, in some embodiments, the printer apparatus 100 continues to track the location of each of the printable portions 410A-410F that were not printed on during the previous print job described with respect to FIG. 4. In some such embodiments, the printer apparatus 100 tracks each of leading edge and/or trailing edge for each of the printable portions 410A-410F, and maintains such locations in a permanent or temporary storage for use in the subsequent print job. It will be appreciated that the printer apparatus 100 may maintain the locations of the printable portions 410A-410F (and/or edge(s) thereof) throughout an idle period during which the printer apparatus 100 enters an idle state (e.g., in the memory 112). Accordingly, the printer apparatus 100 may retrieve such locations and utilize them for performing one or more determinations during the subsequent retraction phase, for example as depicted and described with respect to FIG. 5. For example, in some embodiments, the printer apparatus 100 utilizes such stored data representing stored locations for retracting such that the printable portion 410F is approximately at a particular print position in line with the location of the print head 404 for printing. Additionally or alternatively, the printer apparatus 100 may utilize such stored data representing stored locations for determining the location 502 for use in generating the print position compensation.

During the media retraction phase, the printer apparatus 100 manipulates the print media 400 to move the print media 400 in the retraction direction 506. The print media 400 may be moved in the retraction direction 506 while the printer apparatus 100 is operating in a media retraction phase. For example, the printer apparatus 100 may remain in the media retraction phase to retract the print media 400 in preparation for beginning a subsequent print job from a first printable portion of the print media 400, such as the printable portion 410G of the print media 400. It will be appreciated that the retraction direction 506 may be opposite the output direction 416 as depicted and described with respect to FIG. 4.

The sensor at location 402 may be used to track a location of an edge of a particular printable portion of the print media 400. In some embodiments, the sensor may be used to track the position of the same edge tracked during a corresponding media output phase. As illustrated, for example, the printer apparatus 100 tracks the position of the leading edge for the printable portion 410A of the print media 400 as the print media 400 is retracted. Alternatively or additionally, in some embodiments, the printer apparatus 100 tracks the location of an edge that is closest to, but has previously passed, the sensor at location 402 for determining the second edge position distance 504. In some embodiments, the printer apparatus 100 tracks the location of an edge of a particular edge type that is closest to, but has previously passed, the sensor at location 402 (e.g., the closest leading edge, or the closest trailing edge).

The location 502 may be affected by slippage that occurs during the retraction of the print media 400, and thus is to be compensated for. In some embodiments, the printer apparatus 100 utilizes the sensor at location 402 to detect a timestamp at which a first edge hits reaches the location 402 of the sensor during retraction. In this regard, the different between this timestamp and a timestamp at which retraction was initiated may be utilized to determine how long the edge was travelling to reach the sensor at location 402 from its original location at the beginning of retraction (e.g., the location 502). Utilizing a predetermined (e.g., statically stored) or determinable print speed, the printer apparatus 100 may determine the distance between the location 502 and the location 402 of the sensor. In some embodiments, the leading edge of the printable portion 410A may be determined at a particular location 502 based at least in part on any other data from the sensor at the location 402, known distance(s), and/or a combination thereof.

In the depicted visualization, as illustrated, the leading edge of the printable portion 410A is retracted to a particular location 502. The sensor at the location 402 may track the leading edge as it is retracted to the location 502 during the media retraction phase. In some embodiments, the location 502 of the leading edge of the printable portion 410A is used to determine a second edge position distance 504 associated with a media retraction phase. For example, the leading edge of the printable portion 410A may be tracked to determine a second edge position distance 504 representing the distance between the location 404 of the print head and the location 502. In some embodiments, the sensor at location 402 may be utilized to track a number of dot lines as the print media 400 is moved (e.g., by a motor attached to a platen roller that controls movement of the print media 400). Alternatively or additionally, in some embodiments, the sensor is used to determine timestamp(s) for particular events, and to generate the second edge position distance 504 based at least in part on such timestamps(s) and known data associated with speed at which the print media 400 is moved, a predetermined force applied during retraction, and/or the like. It should be appreciated that, in other embodiments, a trailing edge of a particular printable portion (e.g., the printable portion 410A) is tracked for use in generating the second edge position distance 504.

In some embodiments, the printer apparatus 100 utilizes the edge position distances to generate a print position compensation. In some embodiments, for example, the first edge position distance associated with the media output phase and the second edge position distance associated with the media retraction phase are processed utilizing a determined algorithm for generating the print position compensation. One non-limiting example algorithm includes subtracting the second edge position distance associated with the media retraction phase from the first edge position distance associated with the media output phase to generate a differential edge position, and dividing the differential edge position by a particular divisor factor (e.g., a factor of two).

The determined print position compensation may subsequently be utilized to offset the print position for one or more printable portions of the print media 400. In some embodiments, the print position compensation is utilized to begin printing on each printable portion that had previously passed the sensor but was not utilized in completing a previous print job. For example, in some embodiments, the printer apparatus 100 may utilize the print position compensation to initiate printing at particular positions on each of the printable portions 410F, 410E, 410D, 410C, 410B, and 410A as they are printed in a subsequent print job. For example, the printer apparatus 100 may retract the print media 400 sufficient so that the printable portion 410F reaches the location of the print head 404 based at least in part on the previously stored location(s) of the printable portion 410F (or edges thereof). The printer apparatus 100 may then begin printing data on the pintable position 410F at a default print position offset by the print position compensation. The default print position may be offset by the print position compensation for at least the remaining printable positions 410E, 410D, 410C, 410B, and 410A, and in other embodiments may be utilized for each of the printable positions to be printed in a particular, subsequent print job.

Example Processes Using Edge Position Distances of the Disclosure

Having described example systems, apparatuses, and visualizations for edge position distance determination in accordance with the present disclosure, example processes using edge position distances will now be discussed. For example, example processes for generating print position compensation utilizing edge position distances, and additional and/or alternative operations associated therewith, are further discussed. It will be appreciated that each of the flowcharts depicts an example computer-implemented process that may performed by one or more of the apparatuses, systems, devices, and/or computer program products described herein, for example using one or more of the specially configured components thereof. The blocks depicted indicate operations of each process. Such operations may be in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 6 illustrates a flowchart depicting example operations of an example process for generating and/or utilizing a print position compensation based at least in part on one or more determined edge position distances, in accordance with at least some example embodiments of the present disclosure. Specifically, FIG. 6 illustrates operations of an example process 600. In some embodiments, the example process 600 is embodied by computer program code stored on a non-transitory computer-readable storage medium of a computer program product configured for execution to perform the process as depicted and described. Alternatively or additionally, in some embodiments, the process 600 is performed by one or more specially configured computing devices, such as the printer apparatus 100 alone or in communication with one or more other component(s), device(s), system(s), and/or the like. In this regard, in some such embodiments, the printer apparatus 100 is specially configured by computer-coded instructions (e.g., computer program instructions) stored thereon, for example in the memory 112 and/or another component depicted and/or described herein and/or otherwise accessible to the printer apparatus 100, for performing the operations as depicted and described. In some embodiments, the printer apparatus 100 is in communication with one or more external apparatus(es), system(s), device(s), and/or the like, to perform one or more of the operations as depicted and described. For purposes of simplifying the description, the process 600 is described as performed by and from the perspective of the printer apparatus 100, for example embodying a particular label printer.

The process 600 begins at operation 602. At operation 602, the printer apparatus 100 includes means, such as the sensor 102, the print compensation circuitry 114, the motor 110, the light source 106, the print mechanisms 116, the processor 108, and/or the like, or a combination thereof, to determine, via a sensor, a first edge position distance between a first edge and a print head. The first edge position distance may be determined during a media output phase, for example based at least in part on a determined location of a first edge tracked as the first edge is moved during the media output phase. In some embodiments, the location of the first edge is determined based at least in part on one or more timestamps at which the edge is detected by the sensor, a phase begins and/or ends, and/or the like. In some embodiments, the location of the print head is stored by and/or otherwise known by the printer apparatus 100 for use in determining the first edge position distance. As described herein, the printer apparatus 100 may utilize stored locations of one or more edge(s), printable position(s), and/or the like, from a previous print job for determining the first edge position distance. Alternatively or additionally, in some embodiments, the printer apparatus 100 retrieves a first edge position distance that stored during and/or upon completion of a previous print job. One non-limiting example algorithm for determining the first edge position distance is described herein with respect to FIG. 8, for example based on a location of the first edge during the media output phase.

At operation 604, the printer apparatus 100 includes means, such as the sensor 102, the print compensation circuitry 114, the motor 110, the light source 106, the print mechanisms 116, the processor 108, and/or the like, or a combination thereof, to determine, via the sensor, a second edge position distance between the first edge and the print head. The second edge position distance may be determined during a media retraction phase. For example, the first edge position distance may be determined based at least in part on a determined location of the first edge tracked as the first edge is moved during the media retraction phase. It will be appreciated, as described, that the location of the print head may be known to and/or determined via the sensor of the printer apparatus 100. It will be appreciated that, in some embodiments, the media retraction phase and the media output phase described with respect to operation 602 are a part of different print jobs, for example where the first edge position distance is determined for a previous print job corresponding to the media output phase and the media retraction phase begins a subsequent print job. One non-limiting example algorithm for determining the second edge position distance is determined herein with respect to FIG. 8, for example based on a location of the first edge during the media retraction phase.

At operation 606, the printer apparatus 100 includes means, such as the sensor 102, the print compensation circuitry 114, the motor 110, the light source 106, the print mechanisms 116, the processor 108, and/or the like, or a combination thereof, to generate a print position compensation based at least in part on the first edge position distance and the second edge position distance. The print position compensation represents an offset to be applied to a determined position at which printing is to begin for one or more printable portions of a print media. In some embodiments, the print position compensation represents a value based on the difference between the first edge position distance and the second edge position distance. In this regard, the print position compensation may represent a particular offset for print position drift occurring during output and/or retraction of a print media. One non-limiting example algorithm for generating a print position compensation is determined herein with respect to FIG. 7, for example based at least in part on the first edge position distance and the second edge position distance.

At optional operation 608, the printer apparatus 100 includes means, such as the sensor 102, the print compensation circuitry 114, the motor 110, the light source 106, the print mechanisms 116, the processor 108, and/or the like, or a combination thereof, to execute a boundary check based at least in part on the print position compensation. In some embodiments, the boundary check embodies one or more algorithms that compares the print position compensation to an acceptable maximum threshold. In this regard, the printer apparatus 100 may initiate a boundary check by comparing the print position compensation to a maximum allowable compensation. In a circumstance where the printer apparatus 100 determines the print position compensation exceeds the maximum allowable compensation, the printer apparatus 100 may adjust the print position compensation to equal the maximum allowable compensation. Alternatively or additionally, in some embodiments, the printer apparatus 100 compares the print position compensation with a range of allowable compensation values to determine whether the print position compensation falls within the range. In a circumstance where the print position compensation does not fall within the range, the print position compensation may be adjusted to the nearer of the maximum and/or minimum compensation of the range, rejected and retried, or used to produce an error to an operator of the printer apparatus 100.

In some other embodiments, the printer apparatus 100 determines whether a new print position adjusted based at least in part on the print position compensation is located above a minimum threshold range from one or more edge(s) of a printable portion of a print media. Alternatively or additionally, in some embodiments, the boundary check determines whether a new print position adjusted based on the print position compensation to compensate for drift of a print position falls within an acceptable threshold range of compensations. In some contexts where the printer apparatus 100 determines the boundary check is not satisfied, the printer apparatus 100 restarts the print job and/or indicates one or more action(s) to be performed to reduce drift of the print position (e.g., a notification to replace the print media with a new roll of print media, alter the print job, and/or the like).

At optional operation 610, the printer apparatus 100 includes means, such as the sensor 102, the print compensation circuitry 114, the motor 110, the light source 106, the print mechanisms 116, the processor 108, and/or the like, or a combination thereof, to initiate a print operation based at least in part on the print position compensation. In some embodiments, the printer apparatus 100 initiates a print operation based at least in part on the print position compensation to cause data to be printed starting at a particular position offset from a default or other print position based at least in part on the print position compensation. For example, the print position compensation may indicate a number of dot lines before or after a default print position (a default dot line) at which printing is to begin. In this regard, the printer apparatus 100 may initiate printing onto any number of printable portions of a print media based at least in part on the print position compensation to print data at a particular location that accounts for drift in the print position. In some embodiments, the printer apparatus 100 at least utilizes the print position compensation to adjust the print position utilized for printing on each printable position that had already passed, in whole or in part, the sensor of the printer apparatus 100 prior to the beginning of the media retraction phase.

FIG. 7 illustrates a flowchart depicting example operations of an example process for generating a print position compensation based at least in part on a print position compensation and a divisor factor, in accordance with at least some example embodiments of the present disclosure. Specifically, FIG. 7 depicts operations of an example process 700. In some embodiments, the process 700 is embodied by computer program code stored on a non-transitory computer-readable storage medium of a computer program product configured for execution to perform the process as depicted and described. Alternatively or additionally, in some embodiments, the process 700 is performed by one or more specially configured computing devices, such as the printer apparatus 100 alone or in communication with one or more other component(s), device(s), system(s), and/or the like. In this regard, in some such embodiments, the printer apparatus 100 is specially configured by computer-coded instructions (e.g., computer program instructions) stored thereon, for example in the memory 112 and/or another component depicted and/or described herein and/or otherwise accessible to the printer apparatus 100, for performing the operations as depicted and described. In some embodiments, the printer apparatus 100 is in communication with one or more external apparatus(es), system(s), device(s), and/or the like, to perform one or more of the operations as depicted and described. For purposes of simplifying the description, the process 700 is described as performed by and from the perspective of the printer apparatus 100, for example embodying a particular printer.

The process 700 begins at operation 702. In some embodiments, the process 700 begins after one or more operations depicted and/or described with respect to any of the other processes described herein. For example, in some embodiments as depicted, the process 700 begins after execution of operation 604 as depicted and described with respect to the process 600. In this regard, some or all of the process 700 may replace or supplement one or more blocks depicted and/or described with respect to any of the other processes described herein, such as the operation 606 as depicted and described with respect to the process 600. Upon completion of the process 700, the flow of operations may terminate. Additionally or alternatively, as depicted, upon completion of the process 700, flow may return to one or more operations of another process, for example to the operation 608 as depicted and described with respect to the process 600. It should be appreciated that, in some embodiments, the process 700 embodies a subprocess of one or more other process(es), such as the process 600.

At operation 702, the printer apparatus 100 includes means, such as the sensor 102, the print compensation circuitry 114, the motor 110, the light source 106, the print mechanisms 116, the processor 108, and/or the like, or a combination thereof, to generate a differential edge position distance. In some embodiments, the differential edge position distance represents a difference between the first edge position distance determined during a first media movement phase (e.g., a media output phase) and the second edge position distance determined during a second media movement phase (e.g., a media retraction phase). For example, in some embodiments, the differential edge position distance is generated by subtracting the second edge position distance from the first edge position distance. In this regard, the differential edge position distance represents the difference between the determined distance based on a location of a particular edge during each of a media output phase and a media retraction phase.

At operation 704, the printer apparatus 100 includes means, such as the sensor 102, the print compensation circuitry 114, the motor 110, the light source 106, the print mechanisms 116, the processor 108, and/or the like, or a combination thereof, to generate the print position compensation by dividing the differential edge position distance by a divisor factor. In some embodiments, the divisor factor is predetermined. For example, in one example embodiment, the printer apparatus 100 is configured to utilize a divisor factor of two to divide the differential edge position distance. The divisor factor of two may be used to determine a compensation between the position of an edge affected by print position drift in each of the media output phase and the media retraction phase. Alternatively or additionally, in some embodiments, the divisor factor is determined based at least in part on the first edge position distance, the second edge position distance, and/or other data values determined from operation of the printer apparatus 100.

FIG. 8 illustrates a flowchart depicting example operations of an example process for determining an edge position distance based on a tracked distance travelled during a media movement phase, in accordance with at least some example embodiments of the present disclosure. Specifically, FIG. 8 depicts operations of an example process 800. In some embodiments, the process 800 is embodied by computer program code stored on a non-transitory computer-readable storage medium of a computer program product configured for execution to perform the process as depicted and described. Alternatively or additionally, in some embodiments, the process 800 is performed by one or more specially configured computing devices, such as the printer apparatus 100 alone or in communication with one or more other component(s), device(s), system(s), and/or the like. In this regard, in some such embodiments, the printer apparatus 100 is specially configured by computer-coded instructions (e.g., computer program instructions) stored thereon, for example in the memory 112 and/or another component depicted and/or described herein and/or otherwise accessible to the printer apparatus 100, for performing the operations as depicted and described. In some embodiments, the printer apparatus 100 is in communication with one or more external apparatus(es), system(s), device(s), and/or the like, to perform one or more of the operations as depicted and described. For purposes of simplifying the description, the process 800 is described as performed by and from the perspective of the printer apparatus 100, for example embodying a particular printer.

The process 800 begins at operation 802. In some embodiments, the process 800 begins after one or more operations depicted and/or described with respect to any of the other processes described herein. For example, in some embodiments as depicted, the process 800 begins after execution of operation 602 as depicted and described with respect to the process 600. In this regard, some or all of the process 800 may replace or supplement one or more blocks depicted and/or described with respect to any of the other processes described herein, such as the operation 602 and/or 604 as depicted and described with respect to the process 600. Upon completion of the process 800, the flow of operations may terminate. Additionally or alternatively, as depicted, upon completion of the process 800, flow may return to one or more operations of another process, for example to the operation 604 and/or 606 as depicted and described with respect to the process 600. It should be appreciated that, in some embodiments, the process 800 embodies a subprocess of one or more other process(es), such as the process 600.

At operation 802, the printer apparatus 100 includes means, such as the sensor 102, the print compensation circuitry 114, the motor 110, the light source 106, the print mechanisms 116, the processor 108, and/or the like, or a combination thereof, to the sensor, a first edge associated with a first edge type of at least a printable portion of a print media. For example, sensor output may be processed to detect an edge detection event indicating existence of a particular edge and/or particular edge type. For example, the sensor data at a particular timestamp and/or previous sensor data outputted by the sensor may be processed to detect a particular edge and/or determine whether the particular edge is of a particular edge type (e.g., a leading edge or a trailing edge). In this regard, a leading edge may be indicated by changing sensor data followed by a timestamp or range of timestamps corresponding to a particular baseline value, and/or a trailing edge may be indicated by a particular baseline value followed by changing sensor data. In some embodiments, the printer apparatus 100 detects a particular first edge, for example a first edge associated with a location closest to a sensor during a media output phase. Alternatively or additionally, in some embodiments, the printer apparatus 100 repeats for a particular first edge associated with each printable portion of a plurality of printable portions of a print media, for example for determining a print position compensation associated with each printable portion of the plurality of printable portions.

At operation 804, the printer apparatus 100 includes means, such as the sensor 102, the print compensation circuitry 114, the motor 110, the light source 106, the print mechanisms 116, the processor 108, and/or the like, or a combination thereof, to track a distance traveled by the first edge as a predetermined force is applied to the print media during a media movement phase. In some embodiments, the predetermined force is applied to move the print media in a particular direction based on the media movement phase. For example, in some embodiments, the predetermined force advances the print media for outputting, printing, and/or feeding, such as during a media movement phase embodying a media output phase. In some embodiments, the predetermined force advances the print media for retraction, such as during a media movement phase embodying a media retraction phase. As described herein, the predetermined force may cause the print media to move at a different rate based on slippage of the print media, thus resulting in print position drift. In some embodiments, the printer apparatus 100 tracks the distance traveled by the first edge based on movement detected based on sensor data from the sensor.

At operation 806, the printer apparatus 100 includes means, such as the sensor 102, the print compensation circuitry 114, the motor 110, the light source 106, the print mechanisms 116, the processor 108, and/or the like, or a combination thereof, to determining the first edge position distance based at least in part on the tracked distance traveled by the first edge during the media movement phase. In some embodiments, for example, the printer apparatus 100 determines the first edge position distance corresponding to the tracked distance travelled by the first edge until a particular target location is reached. In one example context, the printer apparatus 100 determines the first edge position distance based on the tracked movement of the first edge to a location associated with a print head of the printer apparatus 100.

FIG. 9 illustrates a flowchart depicting example operations of an example process for resetting a print position compensation, in accordance with at least some example embodiments of the present disclosure. Specifically, FIG. 9 depicts operations of an example process 900. In some embodiments, the process 900 is embodied by computer program code stored on a non-transitory computer-readable storage medium of a computer program product configured for execution to perform the process as depicted and described. Alternatively or additionally, in some embodiments, the process 900 is performed by one or more specially configured computing devices, such as the printer apparatus 100 alone or in communication with one or more other component(s), device(s), system(s), and/or the like. In this regard, in some such embodiments, the printer apparatus 100 is specially configured by computer-coded instructions (e.g., computer program instructions) stored thereon, for example in the memory 112 and/or another component depicted and/or described herein and/or otherwise accessible to the printer apparatus 100, for performing the operations as depicted and described. In some embodiments, the printer apparatus 100 is in communication with one or more external apparatus(es), system(s), device(s), and/or the like, to perform one or more of the operations as depicted and described. For purposes of simplifying the description, the process 900 is described as performed by and from the perspective of the printer apparatus 100, for example embodying a particular printer.

The process 900 begins at operation 902. In some embodiments, the process 900 begins after one or more operations depicted and/or described with respect to any of the other processes described herein. For example, in some embodiments as depicted, the process 900 begins after execution of operation 606 as depicted and described with respect to the process 600. In this regard, some or all of the process 900 may replace or supplement one or more blocks depicted and/or described with respect to any of the other processes described herein, such as the operation 904 as depicted and described with respect to the process 600. Upon completion of the process 900, the flow of operations may terminate. Additionally or alternatively, as depicted, upon completion of the process 900, flow may return to one or more operations of another process, for example to the operation 608 as depicted and described with respect to the process 600. It should be appreciated that, in some embodiments, the process 900 embodies a subprocess of one or more other process(es), such as the process 600.

At operation 902, the printer apparatus 100 includes means, such as the sensor 102, the print compensation circuitry 114, the motor 110, the light source 106, the print mechanisms 116, the processor 108, and/or the like, or a combination thereof, to detecting occurrence of an idle state. In some embodiments, the printer apparatus 100 maintains a timestamp associated with each previously initiated and/or completed print job. The printer apparatus 100 may further maintain or otherwise be associated with a particular maximum timestamp threshold before the printer apparatus 100 initiates an idle state. In this regard, the printer apparatus 100 may determine data representing a time since a stored timestamp at which a previous print job was completed. Additionally, the printer apparatus 100 may compare the data representing the time since the stored timestamp with the maximum timestamp threshold to detect occurrence of the idle state in a circumstance where a new print job has not been initiated within the time represented by the maximum timestamp threshold.

At operation 904, the printer apparatus 100 includes means, such as the sensor 102, the print compensation circuitry 114, the motor 110, the light source 106, the print mechanisms 116, the processor 108, and/or the like, or a combination thereof, to reset the print position compensation in response to detecting occurrence of the idle state. In this regard, the print position compensation may be re-generated upon the next activation of the printer apparatus 100 and/or initiation of a new print job. Alternatively, in some embodiments where the idle state is initiated upon completion of each print job, the print position compensation is re-generated for each print job to maximize the likelihood the print position compensation remains correct for subsequent printing.

Example Visualizations for Phase Timestamp Differential Determinations

Having described example systems, apparatuses, visualizations for edge position distance determination, and flowcharts for printer position compensation based at least in part on edge distance determinations in accordance with the present disclosure, example visualizations of for phase timestamp differential determinations in accordance with the present disclosure will now be discussed. The phase timestamp differential determination process(es) may be utilized for any of a myriad of purposes, for example in generating a print position compensation. In some embodiments, the phase timestamp differential determinations are performed by a specially configured printer, for example the printer apparatus 100. It will be appreciated that the depicted distances are for illustration purposes and not to limit the scope and spirit of this disclosure.

FIG. 10 illustrates an example visualization of phase timestamp differential determination during a media output phase, in accordance with at least some example embodiments of the present disclosure. Specifically, the example visualization depicts a print media 400 including a plurality of printable portions 410A-410G, each separated by a plurality of gaps 408. The visualization further includes a location 1006 at which a sensor (such as a label stop sensor) is located, a location 404 at which a print head is located, and a location 406 at which a tear bar is located. The print media 400 may be maintained within a printer, for example embodied by the printer apparatus 100, that includes print mechanisms at the locations defined by the locations 1006, 404, and 406 to facilitate printing on the print media 400. It will be appreciated that in this regard, the components depicted and described with respect to FIG. 11 perform functionality as similarly described with respect to FIG. 4.

FIG. 10 depicts the location of each of the plurality of printable portions 410A-410G at the end of a previous print job (e.g., a calibration print or another previous print job). As illustrated, the printable portion 410G may be the last printable portion that was printed on during the previous print job. In this regard, the printable portion 410G extends past the location 406 of the tear bar, and may be torn off and/or otherwise removed from the print media 400 upon completion of the previous print job. The remaining plurality of printable portions 110A-110F may utilized for performing a subsequent print job involving one or more printable portion(s), for example as described with respect to FIGS. 10 and 11. In this regard, printer apparatus 100 may utilize the print position compensation at least for printing on each of the printable portions 410A-410F during the subsequent print job. In some such embodiments, the subsequent print job begins with a media retraction phase as depicted and described with respect to FIG. 11.

In some embodiments, the sensor located at the location 1006 embodies a label stop sensor. The label stop sensor may be configured to detect particular events (e.g., existence of an edge, beginning and end of a printable portion such as a label, and/or the like) and/or timestamps associated with such detections. In this regard, the timestamps may be utilized alone or in combination with one or more other portions of data (e.g., a known or determined speed at which a print media is output via the printer apparatus 100) to determine a distance travelled by the print media. For example, the label stop sensor at location 1006 may be used to detect each or at least one edge of the printable portions 410A-410G. In some embodiments, the label stop sensor at location 1006 is used to detect each edge, or each edge of a particular edge type (e.g., a leading edge or a trailing edge) that passes the label stop sensor at location 1006. For any one of the printable portions 410A-410G, the label stop sensor at position 1006 may be used to detect the leading edge of the printable portion and the location of this leading edge may be tracked as output continues. It will be appreciated that the printer apparatus 100 may simultaneously track any number of printable portions of the print media 400, and/or particular edges thereof.

As illustrated, the label stop sensor located at the location 1006 determines timestamps associated with a particular defined distance (e.g., one printable portion and one gap). In some embodiments, the label stop sensor detects a first edge associated with a first printable portion of the print media 400, such as the printable portion 410B as illustrated. The first edge may embody a leading edge associated with the printable portion 410B, and may be detected first based on the movement direction of the print media 400 during a particular media movement phase, such as in the output direction 416. Additionally, the label stop sensor detects a second edge associated with a second printable portion of the print media 400. The second edge may embody a leading edge associated with the next, subsequent printable portion on the print media 400, for example the printable portion 410A as illustrated. The label stop sensor may detect the second edge after the first edge has been detected.

In some embodiments, the label stop sensor at location 1006 is used to track each of the printable portions 410A-410G, and/or edges thereof. For example, the distance an edge travelled from the label stop sensor at location 1006 in the output direction 416 may be determined based at least in part on a timestamp at which the edge is detected and a known or otherwise determinable print speed associated with the printer apparatus 100. In this regard, the label stop sensor at location 1016 may be used to detect the edges defining boundaries of each of the printable portions 410A-410G, and/or track such edges as they move in the output direction 416. It will be appreciated that, similarly to that as described with respect to FIGS. 4 and 5, the printer apparatus 100 may store the location, or at least equivalent data usable to regenerate the location, of each of the detected edges (or at least edges of a particular type) in a memory, storage, or the like to enable retrieval of such locations during a subsequent print job and/or media movement phase, for example as described with respect to FIG. 11.

The label stop sensor may store a timestamp associated with detection of each relevant edge. For example, in some embodiments, the label stop sensor at the location 1006 detects the leading edge that began at 1002B of the printable portion 410B and stores a timestamp representing the time at which the leading edge that began at 1002B of the printable portion 410B was detected. Additionally, in some embodiments, the label stop sensor at the location 1006 detects the leading edge that began at 1002A of the printable portion 410A and stores a timestamp representing the time at which the leading edge that began at 1002A of the printable portion 410A was detected. It will be appreciated, as described herein, that the second edge (e.g., the leading edge that began at 1002A of the printable portion 410A) may be detected based on first detecting a gap between printable portions, for example one of the plurality of gaps 408 after detecting the leading edge that began at 1002B, and/or the trailing edge, of the printable portion 410B.

It will be appreciated that, in other embodiments, another edge type may be detected and used. For example, in some embodiments, the label stop sensor is used to detect the trailing edge of a printable portion of a print media 400 and the trailing edge of a subsequent printable portion of the print media 400. In this regard, the particular edges depicted in FIG. 10 should not limit the scope and/or spirit of this disclosure.

The timestamps associated with the detection of the first leading edge that began at 1002B and the second leading edge that began at 1002A may be utilized to determine an output phase timestamp differential 1004. The output phase timestamp differential 1004 may represent the difference in time between detection of the first leading edge that began at 1002B and the second leading edge that began at 1002A during the media output phase. In this regard, the printer apparatus 100 may detect and store the output phase timestamp differential 1004 for further processing, such as for determining a timestamp-based distance value and/or a print position compensation associated therewith as described herein.

FIG. 11 illustrates an example visualization of phase timestamp differential determination during a media retraction phase, in accordance with at least some example embodiments of the present disclosure. It will be appreciated that the media retraction phase may occur after and/or before the media output phase as described with respect to FIG. 10. For example, in some embodiments, the media retraction phase begins at the initiation of a new print job subsequent to completion of a previous print job, such as at completion of the operations described with respect to FIG. 10. The previous print job may be A CALIBRATION PRINT JOB OR AN ACTUAL PRINT JOB WITH USER-INPUTTED DATA FOR PRINTING. As described herein, the printable portion 410G as depicted and described may be printed for removal from the print media 400 during the previous print job. Accordingly, FIG. 11 is depicted with the printable portion 410G removed.

In some embodiments, the printer apparatus 100 maintains the location of each of the printable portions remaining (e.g., not printed on during a previous print job). For example, in some embodiments, the printer apparatus 100 continues to track the location of each of the printable portions 410A-410F that were not printed on during the print job described with respect to FIG. 10. In some such embodiments, the printer apparatus 100 tracks each of the leading edges and/or trailing edges for each of the printable portions 410A-410F, and maintains such locations in a permanent or temporary storage for retrieval and use during the subsequent print job. It will be appreciated that the printer apparatus 100 may maintain the locations of the printable portions 410A-410F (and/or edge(s) thereof) throughout an idle period during which the printer apparatus 100 enters an idle state (e.g., in the memory 112). Accordingly, the printer apparatus 100 may retrieve such locations and utilize them for performing one or more determinations during the subsequent retraction phase, for example as depicted and described with respect to FIG. 10. For example, in some embodiments, the apparatus 100 utilizes sch stored data representing stored locations for retracting such that the printable portion 410F is at or approximately at a particular print location in line with the location of the print head 404 for printing. Additionally or alternatively, the printer apparatus 100 may utilize such stored data representing stored locations for determining the location 1002B and/or 1002A for use in generating the print position compensation.

During the media retraction phase, the printer apparatus 100 manipulates the print media 400 to move the print media 400 in the retraction direction 506. The print media 400 may be moved in the retraction direction 506 while the printer apparatus 100 is operating in a media retraction phase. For example, the printer apparatus 100 may remain in the media retraction phase to retract the print media 400 in preparation for beginning a subsequent print job from a first printable portion of the print media 400, such as the printable portion 410F of the print media 400. It will be appreciated that the retraction direction 506 may be opposite the output direction 416 as depicted and described with respect to FIG. 10.

The label stop sensor at the location 1016 may be used to determine timestamps associated with another particular reference distance (e.g., one printable portion and one gap) while the print media 400 is moving in the retraction direction 506 during a media retraction phase. In some embodiments, the label stop sensor at the location 1006 detects a first edge associated with a first printable portion based on the retraction direction 506. For example, the label stop sensor at the location 1016 may detect a first edge associated with a first printable portion of the print media 400, such as the printable portion 410A as illustrated. The first edge that began at location 1102A may embody a trailing edge associated with the printable portion 410A, and may be detected first based on the movement direction of the print media 400 during a particular media movement phase, such as the retraction direction 506. Additionally, the label stop sensor detects a second edge associated with a second printable portion of the print media 400. The second edge may similarly embody a trailing edge that began at location 1102B associated with the next, subsequent printable portion on the print media 400, for example the printable portion 410B as illustrated. The label stop sensor may detect the second edge after the first edge has been detected.

The label stop sensor may store a timestamp associated with detection of each relevant edge. For example, in some embodiments, the label stop sensor at location 1006 detects the trailing edge that started at the location 1102A of the printable portion 410A and stores a timestamp representing the time at which the trailing edge that started at location 1102A was detected. Additionally, in some embodiments, the label stop sensor at the location 1006 detects the trailing edge that started at location 1102B of the printable portion 410B and stores a timestamp representing the time at which the trailing edge that started at location 1102B of the printable portion 410B was detected. It will be appreciated, as described herein, that the second edge (e.g., the trailing edge of the printable portion 410B) may be detected based on first detecting a gap between printable portions, for example one of the plurality of gaps 408 after detecting the trailing edge that started at location 1102A, and/or the leading edge, of the printable portion 410A.

Additionally or alternatively, in some embodiments, the printer apparatus 100 determines the locations 1102A and/or 1102B based at least in part on a timestamp at which retraction begins and a timestamp at which the first edge of a particular edge type is detected (e.g., corresponding to location 1102A) and a timestamp at which the second edge of a particular edge type is detected (e.g., corresponding to location 1102B). The printer apparatus 100 may utilize such timestamps together with stored locations and/or distances from a previous print job, for example as described with respect to FIG. 10. For example, in some embodiments, the label stop sensor at location 1016 detects a timestamp at which the closest leading edge is detected (e.g., the leading edge of the printable portion 410A). The printer apparatus 100 may determine a difference between the timestamp at which retraction began and the timestamp at which the leading edge associated with the printable portion 410A was detected, indicating how long the edge travelled to reach the label stop sensor at location 1016. The printer apparatus 100 may then determine the location 1102A by multiplying the difference between the two timestamps by a print speed known to (e.g., stored in memory 112) or otherwise determinable by the printer apparatus 100. The printer apparatus 100 may similarly detect a timestamp at which the leading edge of the printable portion 410B is detected, determine the difference between this timestamp and the timestamp at which retraction began, and multiply by a speed to determine the location 1102B at which the leading edge for the printable portion 410B began. It will be appreciated that, due to slippage, the locations 1102A and/or 1102B may represent different distances from the location 1016 of the label stop sensor than those depicted and described with respect to FIG. 10.

It will be appreciated that, in other embodiments, another edge type may be detected and used. For example, in some embodiments, the label stop sensor is used to detect the leading edge of each printable portion of a print media 400 based on a particular movement direction and/or corresponding media movement phase. In this regard, the particular edges depicted in FIG. 11 should not limit the scope and/or spirit of this disclosure.

The timestamps associated with the detection of the first trailing edge that began at location 1102A and the second trailing edge that began at location 1102B may be utilized to determine a second media movement phase timestamp differential, such as a retraction phase timestamp differential 1104. The retraction phase timestamp differential 1104 may represent the difference in time between detection of the first trailing edge that began at location 1102A and the second trailing edge that began at location 1102B during the media retraction phase. In this regard, the printer apparatus 100 may detect and store the retraction phase timestamp differential 1104 for further processing, such as for determining a timestamp-based distance value and/or a print position compensation associated therewith, as described herein.

In some embodiments, the printer apparatus 100 utilizes the media movement phase timestamp differentials to generate a print position compensation. In some embodiments, for example, the output phase timestamp differential associated with the media output phase and the retraction phase timestamp differential associated with the media retraction phase are processed utilizing a determined algorithm for generating the print position compensation. One non-limiting example algorithm includes subtracting the retraction phase timestamp differential associated with a media retraction phase from the output phase timestamp differential associated with a media output phase to generate a timestamp-based distance value, and multiplying the timestamp-based distance value by a print speed (e.g., a known or determined speed at which the print media 400 is moving). The determined print position compensation may subsequently be utilized to offset the print position for one or more printable portions of the print media 400.

In some embodiments, the printer apparatus 100 performs the operations described with respect to FIGS. 10 and/or 11 a plurality of times for one or more media movement phases. For example, in some embodiments the printer apparatus 100 calibrates a reference media movement phase timestamp differential for a particular movement media phase using a first, reference print media. In some non-limiting example contexts, the printer apparatus 100 generates the media movement phase timestamp differential by performing the operations described using a free-hanging media. The reference media movement phase timestamp differential may be stored as a calibration reference associated with the corresponding media movement phase. The printer apparatus 100 may subsequently store some or all media movement phase timestamp differentials during operation of a particular media movement phase (e.g., each duration to move 1 printable portion of a print media, such as 1 label, and 1 gap). It will be appreciated that other reference distances may be used in other embodiments.

In some embodiments, the stored media movement phase timestamp differentials and the reference media movement phase timestamp differential may subsequently be utilized to generate a print position compensation. The print position compensation may represent a time difference that is used to offset the beginning of printing during a print job. In this regard, the print position compensation defining a time offset may serve as a proxy for a distance offset that accounts for slippage in the print media to be printed.

For example, in some embodiments, the printer apparatus 100 compares a reference media movement phase timestamp differential corresponding to a particular media movement phase in which the printer apparatus 100 is operating with a media movement phase timestamp differential associated with operation without free-hanging the same print media during the same media movement phase. In one example context, the printer apparatus 100 calibrates a reference movement timing embodying an output phase timestamp differential to move a particular reference distance (e.g., 1 label embodying a printable portion of a print media and 1 gap) during a media output phase using a free-hanging media. The printer apparatus 100 then stores all durations when moving the same media while printing. In a circumstance where the media movement phase timestamp differential during operation in the particular media movement phase exceeds the reference media movement phase timestamp differential corresponding to the same media movement phase, the printer apparatus 100 may generate a print position compensation to compensate for slippage causing a difference in the time. The print position compensation may embody a forward-moving (e.g., in accordance with an output media phase) time difference to be applied when determining when to begin printing as the print media moves. For example, in an example context where "X" is defined as a particular media movement phase timestamp differential corresponding to operation of the printer apparatus 100 in a particular media movement phase, and where "Y" is defined as a reference media movement timestamp differential corresponding to the particular media movement phase, the printer apparatus 100 may determine whether X>Y. In a circumstance where X>Y, the printer apparatus 100 may generate a print position compensation as described herein, for example based on the algorithm print position compensation=(X−Y)/Y*100% in percentage of time. It will be appreciated that other algorithms, for example as described herein, may similarly be used. In some such embodiments, the print position compensation embodies a forward-movement time difference to be applied only during a media output phase embodying a print operation.

Example Processes Using Media Movement Phase Timestamp Differentials of the Disclosure Having described example systems, apparatuses, visualizations for edge position distance determination, processes for printer position compensation based at least in part on edge distance determinations, and visualizations of phase timestamp differential determinations, in accordance with the present disclosure, example processes using phase timestamp differential determinations will now be discussed. For example, example processes for generating print position compensation utilizing media movement phase timestamp differentials, and additional and/or alternative operations associated therewith, are further discussed. It will be appreciated that each of the flowcharts depicts an example computer-implemented process that may performed by one or more of the apparatuses, systems, devices, and/or computer program products described herein, for example using one or more of the specially configured components thereof. The blocks depicted indicate operations of each process. Such operations may be in any of a number of ways, including, without limitation, in the order and manner as depicted and described herein. In some embodiments, one or more blocks of any of the processes described herein occur in-between one or more blocks of another process, before one or more blocks of another process, in parallel with one or more blocks of another process, and/or as a sub-process of a second process. Additionally or alternatively, any of the processes may include some or all operational steps described and/or depicted, including one or more optional blocks in some embodiments. With regard to the flowcharts illustrated herein, one or more of the depicted blocks may be optional in some, or all, embodiments of the disclosure. Optional blocks are depicted with broken (or "dashed") lines. Similarly, it should be appreciated that one or more of the operations of each flowchart may be combinable, replaceable, and/or otherwise altered as described herein.

FIG. 12 illustrates a flowchart depicting example operations of an example process for generating and/or utilizing a print position compensation based at least in part on one or more determined phase timestamp differentials, in accordance with at least some example embodiments of the present disclosure. Specifically, FIG. 12 illustrates operations of an example process 1200. In some embodiments, the example process 1200 is embodied by computer program code stored on a non-transitory computer-readable storage medium of a computer program product configured for execution to perform the process as depicted and described. Alternatively or additionally, in some embodiments, the process 1200 is performed by one or more specially configured computing devices, such as the printer apparatus 100 alone or in communication with one or more other component(s), device(s), system(s), and/or the like. In this regard, in some such embodiments, the printer apparatus 100 is specially configured by computer-coded instructions (e.g., computer program instructions) stored thereon, for example in the memory 112 and/or another component depicted and/or described herein and/or otherwise accessible to the printer apparatus 100, for performing the operations as depicted and described. In some embodiments, the printer apparatus 100 is in communication with one or more external apparatus(es), system(s), device(s), and/or the like, to perform one or more of the operations as depicted and described. For purposes of simplifying the description, the process 1200 is described as performed by and from the perspective of the printer apparatus 100, for example embodying a particular label printer.

The process 1200 begins at operation 1202. At operation 1202, the printer apparatus 100 includes means, such as the sensor 102, the print compensation circuitry 114, the motor 110, the light source 106, the print mechanisms 116, the processor 108, and/or the like, or a combination thereof, to detect, via a sensor and during a media output phase, an output phase timestamp differential. The output phase timestamp differential is based at least in part on a first edge associated with a first printable portion of a print media. The output phase timestamp differential is further based at least in part on a second edge associated with a second printable portion of a print media. In some embodiments, the first edge and the second edge are the same edge type. Additionally or alternatively, in some embodiments, the second printable portion of the print media is subsequent to the first printable portion of the print media based at least in part on an output direction corresponding to the media output phase. In some embodiments, the output phase timestamp differential is determined based on the difference between a timestamp associated with detection of the first edge and a second timestamp associated with detection of a second edge. Non-limiting example processes for determining an output phase timestamp differential are described herein with respect to FIGS. 13 and 14.

At operation 1204, the printer apparatus 100 includes means, such as the sensor 102, the print compensation circuitry 114, the motor 110, the light source 106, the print mechanisms 116, the processor 108, and/or the like, or a combination thereof, to detect, via the sensor and during a media retraction phase, a retraction phase timestamp differential. The retraction phase timestamp differential is based at least in part on a third edge associated with a third printable portion of the print media. The retraction phase timestamp differential is further based at least in part on a fourth edge associated with a fourth printable portion of the print media. In some embodiments, the first printable portion and the second printable portion as described with respect to operation 1202 correspond to the third printable portion and the fourth printable portion, such that edges of the same printable portions are utilized for determination of the output phase timestamp differential and the retraction phase timestamp differential. Additionally or alternatively, in some embodiments, the same edges of the same printable portions are processed for each media movement phase. In yet some other embodiments, opposite edges of the same printable portions of the print media are processed, such that the same type of edges is processed accounting for the change in movement direction. Non-limiting example processes for determining a retraction phase timestamp differential are described herein with respect to FIGS. 13 and 14.

At operation 1206, the printer apparatus 100 includes means, such as the sensor 102, the print compensation circuitry 114, the motor 110, the light source 106, the print mechanisms 116, the processor 108, and/or the like, or a combination thereof, to generate a print position compensation. In some embodiments, the printer apparatus 100 generates the print position compensation based at least in part on the output phase timestamp differential and the retraction phase timestamp differential. In some embodiments, the print position compensation represents an offset at which printing should begin based at least in part on a difference between the output phase timestamp differential and the retraction phase timestamp differential. In this regard, the print position compensation may be generated based at least in part on the output phase timestamp differential and the retraction phase timestamp differential to account for a drift to a print position indicated by such media movement phase timestamp differentials. A non-limiting example process for generating a print position compensation based at least in part on the output phase timestamp differential and the retraction phase timestamp differential is described herein with respect to FIG. 15.

Optionally, in some embodiments, the printer apparatus 100 performs one or more operations based at least in part on the print position compensation. For example, in some embodiments, the printer apparatus 100 includes means, such as the sensor 102, the print compensation circuitry 114, the motor 110, the light source 106, the print mechanisms 116, the processor 108, and/or the like, or a combination thereof, to execute a boundary check based at least in part on the print position compensation, as described herein with respect to the operation 608. Additionally or alternatively, optionally in some embodiments, the printer apparatus 100 includes means, such as the sensor 102, the print compensation circuitry 114, the motor 110, the light source 106, the print mechanisms 116, the processor 108, and/or the like, or a combination thereof, to initiate a print operation based at least in part on the print position compensation determined at operation 1206. In some embodiments, the print position compensation is utilized to compensate for the forward movement by altering the timing at which a print head is activated to print on a particular printable portion of a print media. It will be appreciated that these optional operations may otherwise perform similarly to the operations described with respect to operations 608 and 610 respectively. Accordingly, in the interest of brevity and clarity of this description, repeated disclosure of such functions is omitted.

FIG. 13 illustrates a flowchart depicting example operations of an example process for determining a media movement phase timestamp differential associated with a particular media movement phase, in accordance with at least some example embodiments of the present disclosure. Specifically, FIG. 13 depicts operations of an example process 1300. In some embodiments, the process 1300 is embodied by computer program code stored on a non-transitory computer-readable storage medium of a computer program product configured for execution to perform the process as depicted and described. Alternatively or additionally, in some embodiments, the process 1300 is performed by one or more specially configured computing devices, such as the printer apparatus 100 alone or in communication with one or more other component(s), device(s), system(s), and/or the like. In this regard, in some such embodiments, the printer apparatus 100 is specially configured by computer-coded instructions (e.g., computer program instructions) stored thereon, for example in the memory 112 and/or another component depicted and/or described herein and/or otherwise accessible to the printer apparatus 100, for performing the operations as depicted and described. In some embodiments, the printer apparatus 100 is in communication with one or more external apparatus(es), system(s), device(s), and/or the like, to perform one or more of the operations as depicted and described. For purposes of simplifying the description, the process 1300 is described as performed by and from the perspective of the printer apparatus 100, for example embodying a particular printer.

The process 1300 begins at operation 1302. In some embodiments, the process 1300 begins after one or more operations depicted and/or described with respect to any of the other processes described herein. For example, in some embodiments as depicted, the process 1300 begins after execution of operation 1202 and/or 1204 as depicted and described with respect to the process 1200. In this regard, some or all of the process 1300 may replace or supplement one or more blocks depicted and/or described with respect to any of the other processes described herein, such as the operation 1204 and/or 1206 as depicted and described with respect to the process 1200. Upon completion of the process 1300, the flow of operations may terminate. Additionally or alternatively, as depicted, upon completion of the process 1300, flow may return to one or more operations of another process, for example to the operation 1204 and/or 1206 as depicted and described with respect to the process 1200. It should be appreciated that, in some embodiments, the process 1300 embodies a subprocess of one or more other process(es), such as the process 600.

At operation 1302, the printer apparatus 100 includes means, such as the sensor 102, the print compensation circuitry 114, the motor 110, the light source 106, the print mechanisms 116, the processor 108, and/or the like, or a combination thereof, to identify, during a media movement phase, a first event timestamp associated with a first edge detection event associated with the first edge. In some embodiments, the sensor detects the first edge detection event, and identifies the first event timestamp representing the current time at which the first edge detection event was detected. Alternatively or additionally, in some embodiments, one or more other components of the printer apparatus 100 receives data indicating detection of the first edge detection event from the sensor, and identifies the first event timestamp representing the current time. In some embodiments for example, the sensor 102, the print compensation circuitry 114, and/or the processor 108 maintains access to a current timestamp, such that the current timestamp can be retrieved and stored as the first event timestamp upon detection of the first edge detection event associated with the first edge.

At operation 1304, the printer apparatus 100 includes means, such as the sensor 102, the print compensation circuitry 114, the motor 110, the light source 106, the print mechanisms 116, the processor 108, and/or the like, or a combination thereof, to identify, during the media movement phase, a second event timestamp associated with a second edge detection event associated with the second edge. In this regard, the second event timestamp may represent a timestamp at which a subsequent edge of a particular edge type was detected for a subsequent printable portion on the print media. In some embodiments, the sensor similarly detects the second edge detection event, and identifies the second event timestamp representing the current time at which the second edge detection event was detected. Alternatively or additionally, in some embodiments, the one or more other components of the printer apparatus 100 receives data indicating detection of the second edge detection event from the sensor, and identifies the second event timestamp representing the current time.

At operation 1306, the printer apparatus 100 includes means, such as the sensor 102, the print compensation circuitry 114, the motor 110, the light source 106, the print mechanisms 116, the processor 108, and/or the like, or a combination thereof, to determine the media movement phase timestamp differential. The media movement phase timestamp differential is determined based at least in part on the first event timestamp and the second event timestamp. In some embodiments, for example, the media movement phase timestamp differential for a particular media movement phase is determined based on the difference between the first event timestamp and the second event timestamp. In this regard, the media movement phase timestamp differential may indicate the time difference between a first edge crossing and/or otherwise being detected by the sensor, and a second edge crossing and/or otherwise being detected by the sensor. It will be appreciated that the media movement phase timestamp differential determined may correspond particularly to the current media movement phase that the printer apparatus 100 is set to during identification of the first event timestamp and the second event timestamp (e.g., a media output phase or a media retraction phase).

FIG. 14 illustrates a flowchart depicting example operations of an example process for generating a media movement phase timestamp differential associated with a media movement phase, in accordance with at least some example embodiments of the present disclosure. Specifically, FIG. 14 depicts operations of an example process 1400. In some embodiments, the process 1400 is embodied by computer program code stored on a non-transitory computer-readable storage medium of a computer program product configured for execution to perform the process as depicted and described. Alternatively or additionally, in some embodiments, the process 1400 is performed by one or more specially configured computing devices, such as the printer apparatus 100 alone or in communication with one or more other component(s), device(s), system(s), and/or the like. In this regard, in some such embodiments, the printer apparatus 100 is specially configured by computer-coded instructions (e.g., computer program instructions) stored thereon, for example in the memory 112 and/or another component depicted and/or described herein and/or otherwise accessible to the printer apparatus 100, for performing the operations as depicted and described. In some embodiments, the printer apparatus 100 is in communication with one or more external apparatus(es), system(s), device(s), and/or the like, to perform one or more of the operations as depicted and described. For purposes of simplifying the description, the process 1400 is described as performed by and from the perspective of the printer apparatus 100, for example embodying a particular printer.

The process 1400 begins at operation 1402. In some embodiments, the process 1400 begins after one or more operations depicted and/or described with respect to any of the other processes described herein. For example, in some embodiments as depicted, the process 1400 begins after execution of operation 1202 and/or 1204 as depicted and described with respect to the process 1200. In this regard, some or all of the process 1400 may replace or supplement one or more blocks depicted and/or described with respect to any of the other processes described herein, such as the operation 1204 and/or 1206 as depicted and described with respect to the process 1200. Upon completion of the process 1400, the flow of operations may terminate. Additionally or alternatively, as depicted, upon completion of the process 1400, flow may return to one or more operations of another process, for example to the operation 1204 and/or 1206 as depicted and described with respect to the process 1200. It should be appreciated that, in some embodiments, the process 1400 embodies a subprocess of one or more other process(es), such as the process 600.

At operation 1402, the printer apparatus 100 includes means, such as the sensor 102, the print compensation circuitry 114, the motor 110, the light source 106, the print mechanisms 116, the processor 108, and/or the like, or a combination thereof, to detect, via the sensor, a first edge detection event during a media movement phase. In some embodiments, the printer apparatus 100 detects an edge detection event based at least in part on a change in a value represented in the sensor output to and/or from a baseline value (e.g., indicating a leading and/or trailing edge, respectively, in accordance with a particular movement direction). In this regard, the sensor and/or another component of the printer apparatus 100 may monitor and/or otherwise process the sensor output to detect a particular edge detection event based at least in part on such changes in the sensor output. Additionally, in some embodiments, the printer apparatus 100 determines an edge type associated with an edge detected via the first edge detection event, for example based on the changes in the sensor output corresponding to the first edge detection event.

At operation 1404, the printer apparatus 100 includes means, such as the sensor 102, the print compensation circuitry 114, the motor 110, the light source 106, the print mechanisms 116, the processor 108, and/or the like, or a combination thereof, to determine, via the sensor, a first event timestamp associated with the first edge detection event. In some embodiments, the sensor outputs the first event timestamp representing the time the first edge detection event was detected. Alternatively or additionally, in some embodiments, in circumstances where the printer apparatus 100 detects the first edge detection event the printer apparatus 100 determines the first event timestamp associated with the first edge detection event embodying the time at which the change in the sensor data occurred and/or was captured by the sensor. In some embodiments, for example, the printer apparatus 100 maintains the sensor output associated with a timestamp at which the sensor output was captured by the sensor and/or received by other components of the printer apparatus 100 for processing.

At operation 1406, the printer apparatus 100 includes means, such as the sensor 102, the print compensation circuitry 114, the motor 110, the light source 106, the print mechanisms 116, the processor 108, and/or the like, or a combination thereof, to detect, via the sensor, a second edge detection event during the media movement phase. The second edge detection event may correspond to detection of a second edge associated with the same edge type as the first edge detected with respect to the first edge detection event. For example, the second edge detection event may represent detection of the same edge type for a second printable portion of a particular print media, such as the subsequent printable portion of a print media after a first printable portion associated with the first edge. It will be appreciated that the second edge detection event may similarly be detected based at least in part on a change in value represented in the sensor output to and/or from a baseline value, as described with respect to operation 1402.

At operation 1408, the printer apparatus 100 includes means, such as the sensor 102, the print compensation circuitry 114, the motor 110, the light source 106, the print mechanisms 116, the processor 108, and/or the like, or a combination thereof, to determine, via the sensor, a second event timestamp associated with the second edge detection event. The second event timestamp may similarly represent the time the second edge detection event was detected. It will be appreciated that the second event timestamp associated with the second edge detection event may be determined in a manner similar to that described herein with respect to operation 1404.

At operation 1410, the printer apparatus 100 includes means, such as the sensor 102, the print compensation circuitry 114, the motor 110, the light source 106, the print mechanisms 116, the processor 108, and/or the like, or a combination thereof, to generate the media movement phase timestamp differential associated with the media movement phase. In some embodiments, the media movement phase timestamp differential associated with the media movement phase is generated by subtracting the second event timestamp associated with the media movement phase from the first timestamp associated with the media movement phase. In this regard, it will be appreciated that the media movement phase timestamp differential represents the difference in the timestamps at which the first edge detection event and the second edge detection event were detected for the particular media movement phase. Such operations may be repeated for any number of media movement phases (e.g., for both and/or either of a media output phase and a media retraction phase).

FIG. 15 illustrates a flowchart depicting example operations of an example process for generating a print position compensation based at least in part on a timestamp-based distance value, in accordance with at least some example embodiments of the present disclosure. Specifically, FIG. 15 depicts operations of an example process 1500. In some embodiments, the process 1500 is embodied by computer program code stored on a non-transitory computer-readable storage medium of a computer program product configured for execution to perform the process as depicted and described. Alternatively or additionally, in some embodiments, the process 1500 is performed by one or more specially configured computing devices, such as the printer apparatus 100 alone or in communication with one or more other component(s), device(s), system(s), and/or the like. In this regard, in some such embodiments, the printer apparatus 100 is specially configured by computer-coded instructions (e.g., computer program instructions) stored thereon, for example in the memory 112 and/or another component depicted and/or described herein and/or otherwise accessible to the printer apparatus 100, for performing the operations as depicted and described. In some embodiments, the printer apparatus 100 is in communication with one or more external apparatus(es), system(s), device(s), and/or the like, to perform one or more of the operations as depicted and described. For purposes of simplifying the description, the process 1500 is described as performed by and from the perspective of the printer apparatus 100, for example embodying a particular printer.

The process 1500 begins at operation 1502. In some embodiments, the process 1500 begins after one or more operations depicted and/or described with respect to any of the other processes described herein. For example, in some embodiments as depicted, the process 1500 begins after execution of operation 1204 as depicted and described with respect to the process 1200. In this regard, some or all of the process 1500 may replace or supplement one or more blocks depicted and/or described with respect to any of the other processes described herein, such as the operation 1206 as depicted and described with respect to the process 1200. Upon completion of the process 1500, the flow of operations may terminate. Additionally or alternatively, as depicted, upon completion of the process 1500, flow may return to one or more operations of another process, for example to the operation 1204 and/or 1206 as depicted and described with respect to the process 1500. It should be appreciated that, in some embodiments, the process 1400 embodies a subprocess of one or more other process(es), such as the process 600.

At operation 1502, the printer apparatus 100 includes means, such as the sensor 102, the print compensation circuitry 114, the motor 110, the light source 106, the print mechanisms 116, the processor 108, and/or the like, or a combination thereof, to generate a timestamp-based distance value. In some embodiments, the timestamp-based distance value is generated by subtracting the retraction phase timestamp differential from the output phase timestamp differential. The timestamp-based distance value represents a difference in the time a particular edge took to travel a particular distance between the media output phase and the media retraction phase. It will be appreciated that, in other embodiments, the output phase timestamp differential is subtracted from the retraction phase timestamp differential to generate the timestamp-based distance value.

At operation 1504, the printer apparatus 100 includes means, such as the sensor 102, the print compensation circuitry 114, the motor 110, the light source 106, the print mechanisms 116, the processor 108, and/or the like, or a combination thereof, to generate the print position compensation by multiplying the timestamp-based distance value with a print speed. The print speed may represent a speed at which a print media moves within the printer apparatus 100 during printing and/or output generally. In some embodiments, the printer apparatus 100 maintains and/or otherwise stores a known print speed, and retrieves the known print speed for processing. Alternatively or additionally, in some embodiments, the printer apparatus 100 determines the print speed by processing data output by the sensor (e.g., a number of dot lines over a particular change in timestamp). In some embodiments, the print speed is based at least in part on a determinable step size (e.g., one dot line) that the sensor measures over a particular timestamp interval.

FIG. 16 illustrates a flowchart depicting example operations of an example process for determining a media movement phase timestamp differential based on edge and timestamp detection and storage via a sensor, in accordance with at least some example embodiments of the present disclosure. Specifically, FIG. 16 depicts operations of an example process 1600. In some embodiments, the process 1600 is embodied by computer program code stored on a non-transitory computer-readable storage medium of a computer program product configured for execution to perform the process as depicted and described. Alternatively or additionally, in some embodiments, the process 1600 is performed by one or more specially configured computing devices, such as the printer apparatus 100 alone or in communication with one or more other component(s), device(s), system(s), and/or the like. In this regard, in some such embodiments, the printer apparatus 100 is specially configured by computer-coded instructions (e.g., computer program instructions) stored thereon, for example in the memory 112 and/or another component depicted and/or described herein and/or otherwise accessible to the printer apparatus 100, for performing the operations as depicted and described. In some embodiments, the printer apparatus 100 is in communication with one or more external apparatus(es), system(s), device(s), and/or the like, to perform one or more of the operations as depicted and described. For purposes of simplifying the description, the process 1600 is described as performed by and from the perspective of the printer apparatus 100, for example embodying a particular printer.

The process 1600 begins at operation 1602. In some embodiments, the process 1600 begins after one or more operations depicted and/or described with respect to any of the other processes described herein. For example, in some embodiments as depicted, the process 1600 begins after execution of operation 1202 and/or 1204 as depicted and described with respect to the process 1200. In this regard, some or all of the process 1600 may replace or supplement one or more blocks depicted and/or described with respect to any of the other processes described herein, such as the operation 1204 and/or 1206 as depicted and described with respect to the process 1200. Upon completion of the process 1600, the flow of operations may terminate. Additionally or alternatively, as depicted, upon completion of the process 1600, flow may return to one or more operations of another process, for example to the operation 1204 and/or 1206 as depicted and described with respect to the process 1600. It should be appreciated that, in some embodiments, the process 1600 embodies a subprocess of one or more other process(es), such as the process 1200.

At operation 1602, the printer apparatus 100 includes means, such as the sensor 102, the print compensation circuitry 114, the motor 110, the light source 106, the print mechanisms 116, the processor 108, and/or the like, or a combination thereof, to progress a print media by one dot line. The printer apparatus 100 may progress the print media by one dot line in a particular direction consistent with a current media movement phase. For example, the printer apparatus 100 may progress the print media in a first direction during a media output phase (e.g., towards output of the print media), and progress the print media in a second direction during a media retraction phase (e.g., towards retracting of the print media). In some embodiments, to progress the print media, the printer apparatus 100 activates the motor 110 that applies a predetermined force to the print media, for example via a platen roller of the printer apparatus 100.

At operation 1604, the printer apparatus 100 includes means, such as the sensor 102, the print compensation circuitry 114, the motor 110, the light source 106, the print mechanisms 116, the processor 108, and/or the like, or a combination thereof, to determine sensor data corresponding to the sensor from an analog-to-digital converter associated with the sensor. In this regard, the analog-to-digital converter associated with the sensor may be used to convert analog signals captured by the sensor to digital data output representing such analog signals. For example, the sensor data may represent data values generated from light rays interacting with the sensor through a print media, with different voltages based at least in part on the intensity of the light rays that reach the sensor.

At operation 1606, the printer apparatus 100 includes means, such as the sensor 102, the print compensation circuitry 114, the motor 110, the light source 106, the print mechanisms 116, the processor 108, and/or the like, or a combination thereof, to determine if the sensor data indicates edge of a particular edge type. For example, in some embodiments, the printer apparatus 100 processes the sensor data to detect an edge detection event corresponding to a particular edge type (e.g., a leading edge or a trailing edge corresponding to a movement direction for a current media movement phase). The edge detection event may be detected based at least in part on the current sensor data and/or previous sensor data output at one or more previous timestamps. For example, the printer apparatus 100 may process the sensor data and previous sensor data to detect changes in the sensor data that are indicative of an edge of a particular edge type (e.g., as described herein with respect to FIG. 3). In some embodiments, the particular edge type to be determined is predetermined and/or otherwise set based at least in part on a configuration of the printer apparatus 100. For example, in some embodiments, the printer apparatus 100 processes the sensor data to determine if the sensor data indicates a leading edge of a printable portion of a print media.

In circumstances where the printer apparatus 100 determines the sensor data does not indicate an edge of a particular edge type (e.g., the sensor data does not indicate an edge or indicates an edge of the incorrect edge type), flow returns to operation 1602. In this regard, the flow may proceed to continuously progress the print media while searching for the next edge of a particular edge type. In circumstances where the printer apparatus 100 determines the sensor data indicates an edge of a particular edge type, flow proceeds to operation 1608.

At operation 1608, the printer apparatus 100 includes means, such as the sensor 102, the print compensation circuitry 114, the motor 110, the light source 106, the print mechanisms 116, the processor 108, and/or the like, or a combination thereof, to store data indicating the edge and/or the timestamp at which the edge was detected. In some embodiments, the printer apparatus 100 stores data embodying, associated with, and/or otherwise indicating whether the edge is the first detected edge of the particular edge type or second. Additionally or alternatively, in some embodiments, the printer apparatus 100 stores data embodying, associated with, and/or otherwise indicating the timestamp at which the edge was detected. In some embodiments, a timestamp is determined based at least in part on the timestamp at which the sensor data was captured. The timestamp may be received from the sensor, determined by a processor 108 of the printer apparatus 100, and/or the like. In some embodiments, the printer apparatus 100 stores the data indicating the edge and/or the timestamp in a cache, memory (e.g., the memory 112), permanent storage, and/or the like.

At operation 1610, the printer apparatus 100 includes means, such as the sensor 102, the print compensation circuitry 114, the motor 110, the light source 106, the print mechanisms 116, the processor 108, and/or the like, or a combination thereof, to determine whether the detected edge is the second edge of a particular edge type. In some embodiments, the printer apparatus 100 queries and/or otherwise checks for stored edge and/or timestamp data to determine whether data associated with another edge had been previously detected and/or stored. The printer apparatus 100 may determine the edge is a second edge in circumstances where the printer apparatus 100 retrieves and/or identifies previously stored data indicating a detected edge and/or timestamp associated therewith.

In circumstances where the printer apparatus 100 determines the detected edge is not the second edge of the particular edge type, flow returns to operation 1602. In this regard, the printer apparatus 100 continues to progress the print media until the second edge of a particular edge type is detected. For example, the second edge of the particular edge type may indicate that the print media has moved a particular distance (e.g., corresponding to a width of a printable portion of the print media and a gap between a first printable portion and a second, next printable portion) of the print media. In circumstances where the printer apparatus 100 determines the detected edge is the second edge of the particular edge type, flow continues to operation 1612.

At operation 1602, the printer apparatus 100 includes means, such as the sensor 102, the print compensation circuitry 114, the motor 110, the light source 106, the print mechanisms 116, the processor 108, and/or the like, or a combination thereof, to determine a media movement phase timestamp differential from a first timestamp associated with detection of a first edge and a second timestamp associated with detection of a second edge. In some embodiments, the media movement phase timestamp differential is determined by subtracting the timestamp representing a time at which the second edge of the particular edge type was detected from the timestamp representing a time at which the first edge of the particular edge type was detected. Alternatively or additionally, in some embodiments, the media movement phase timestamp differential is determined by subtracting the timestamp representing a time at which the first edge of the particular edge type was detected from the timestamp representing a time at which the second edge of the particular edge type was detected. In this regard, the media movement phase timestamp differential represents the amount of time that passed during movement of the print media the distance between the first detected edge of the particular edge type and the second detected edge of the particular edge type.

The media movement phase timestamp differential may correspond to the particular media movement phase to which the printer apparatus 100 is currently set. For example, the media movement phase timestamp differential may represent an output phase timestamp differential corresponding to a media output phase in circumstances where the printer apparatus 100 is currently set to the media output phase, and the media movement phase timestamp differential may represent a retraction phase timestamp differential corresponding to a media retraction phase in a circumstance where the printer apparatus 100 is currently set to the media retraction phase. In some embodiments, the printer apparatus 100 temporarily or permanently stress the media movement phase timestamp different corresponding to the media movement phase to which the printer apparatus is currently set.

In some embodiments, the media movement phase timestamp differential may be subsequently processed for any of a myriad of purposes. For example, in some embodiments, the printer apparatus 100 performs the process 1600 to generate a media movement phase timestamp differential embodying a media output phase timestamp differential corresponding to a media output phase, and the printer apparatus 100 similarly performs the process 1600 to generate a media movement plan timestamp embodying a media retraction timestamp differential corresponding to a media retraction phase. Such resulting media movement phase timestamp differentials may subsequently be processed to determine a print position compensation for further processing, for example as described herein with respect to FIGS. 12 and/or 15, based at least in part on a print speed. The resulting print position compensation may be utilized to offset the starting position at which a print job is initiated for one or more printable positions on a print media (e.g., for printing on one or more labels on the print media).

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus comprising at least one processor and at least one memory having computer-coded instructions stored thereon that, in execution with the at least one processor, cause the apparatus to:
   determine, via a sensor and during a media output phase, an output phase timestamp differential based at least in part on a first edge associated with a first printable portion of a print media and a second edge associated with a second printable portion of the print media;
   determine, via the sensor during a media retraction phase, a retraction phase timestamp differential based at least in part on a third edge associated with a third printable portion of the print media and a fourth edge associated with a fourth printable portion of the print media; and
   generate a print position compensation based at least in part on the output phase timestamp differential and the retraction phase timestamp differential.

2. The apparatus according to claim 1, wherein to determine, via the sensor and during the media output phase, the output phase timestamp differential, the apparatus is caused to:
   identify, during the media output phase, a first event timestamp associated with a first edge detection event associated with the first edge;
   identify, during the media output phase, a second event timestamp associated with a second edge detection event associated with the second edge; and
   determine the output phase timestamp differential based at least in part on the first event timestamp and the second event timestamp.

3. The apparatus according to claim 1, wherein to determine, via the sensor and during the media output phase, the output phase timestamp differential, the apparatus is caused to:
   detect, via the sensor, a first edge detection event during the media output phase;
   determine, via the sensor, a first event timestamp associated with the first edge detection event;
   detect, via the sensor, a second edge detection event during the media output phase;
   determine, via the sensor, a second event timestamp associated with the second edge detection event; and
   generate the output phase timestamp differential by subtracting the second event timestamp from the first event timestamp.

4. The apparatus according to claim 1, wherein to determine, via the sensor and during the media retraction phase, the retraction phase timestamp differential, the apparatus is caused to:
   identify, during the media retraction phase, a first event timestamp associated with a first edge detection event associated with the first edge;
   identify, during the media retraction phase, a second event timestamp associated with a second edge detection event associated with the second edge; and
   determine the retraction phase timestamp differential based at least in part on the first event timestamp and the second event timestamp.

5. The apparatus according to claim 1, wherein to determine, via the sensor and during the media retraction phase, the retraction phase timestamp differential, the apparatus is caused to:
   detect, via the sensor, a first edge detection event during the media retraction phase;
   determine, via the sensor, a first event timestamp associated with the first edge detection event;
   detect, via the sensor, a second edge detection event during the media retraction phase;
   determine, via the sensor, a second event timestamp associated with the second edge detection event; and
   generate the retraction phase timestamp differential by subtracting the second event timestamp from the first event timestamp.

6. The apparatus according to claim 1, wherein to generate the print position compensation, the apparatus is caused to:
   generate a timestamp-based distance value by subtracting the retraction phase timestamp differential from the output phase timestamp differential; and generate the print position compensation by multiplying the timestamp-based distance value with a print speed.

7. The apparatus according to claim 1, wherein to determine the retraction phase timestamp differential, the apparatus is caused to:
repeatedly until the first edge of a first edge type is detected:
progress the print media by one dot line;
determine sensor data corresponding to the sensor from an analog-to-digital converter associated with the sensor,
determine whether the sensor data indicates the first edge of the first edge type;
in a circumstance where the sensor data indicates the first edge of the first edge type:
determine a first timestamp associated with detection of the first edge;
store the first timestamp associated with detection of the first edge;
repeatedly until the second edge of the first edge type is detected:
progress the print media by one dot line;
determine second sensor data corresponding to the sensor from the analog-to-digital converter associated with the sensor;
determine whether the sensor data indicates the second edge of the first edge type;
in a circumstance where the second sensor data indicates the second edge of the first edge type:
determine a second timestamp associated with detection of the first edge;
store the second timestamp associated with detection of the second edge; and
determine the retraction phase timestamp differential from the first timestamp associated with detection of the first edge and the second timestamp associated with detection of the second edge.

8. A computer-implemented method comprising:
determining, via a sensor and during a media output phase, an output phase timestamp differential based at least in part on a first edge associated with a first printable portion of a print media and a second edge associated with a second printable portion of the print media;
determining, via the sensor during a media retraction phase, a retraction phase timestamp differential based at least in part on a third edge associated with a third printable portion of the print media and a fourth edge associated with a fourth printable portion of the print media; and
generating a print position compensation based at least in part on the output phase timestamp differential and the retraction phase timestamp differential.

9. The computer-implemented method according to claim 8, wherein determining, via the sensor and during the media output phase, the output phase timestamp differential comprises:
identifying, during the media output phase, a first event timestamp associated with a first edge detection event associated with the first edge;
identifying, during the media output phase, a second event timestamp associated with a second edge detection event associated with the second edge; and
determining the output phase timestamp differential based at least in part on the first event timestamp and the second event timestamp.

10. The computer-implemented method according to claim 8, wherein determining, via the sensor and during the media output phase, the output phase timestamp differential comprises:
detecting, via the sensor, a first edge detection event during the media output phase;
determining, via the sensor, a first event timestamp associated with the first edge detection event;
detecting, via the sensor, a second edge detection event during the media output phase;
determining, via the sensor, a second event timestamp associated with the second edge detection event; and
generating the output phase timestamp differential by subtracting the second event timestamp from the first event timestamp.

11. The computer-implemented method according to claim 8, wherein determining, via the sensor and during the media retraction phase, the retraction phase timestamp differential comprises:
identifying, during the media retraction phase, a first event timestamp associated with a first edge detection event associated with the first edge;
identifying, during the media retraction phase, a second event timestamp associated with a second edge detection event associated with the second edge; and
determining the retraction phase timestamp differential based at least in part on the first event timestamp and the second event timestamp.

12. The computer-implemented method according to claim 8, wherein determining, via the sensor and during the media retraction phase, the retraction phase timestamp differential comprises:
detecting, via the sensor, a first edge detection event during the media retraction phase;
determining, via the sensor, a first event timestamp associated with the first edge detection event;
detecting, via the sensor, a second edge detection event during the media retraction phase;
determining, via the sensor, a second event timestamp associated with the second edge detection event; and
generating the retraction phase timestamp differential by subtracting the second event timestamp from the first event timestamp.

13. The computer-implemented method according to claim 8, wherein generating the print position compensation comprises:
generating a timestamp-based distance value by subtracting the retraction phase timestamp differential from the output phase timestamp differential; and
generating the print position compensation by multiplying the timestamp-based distance value with a print speed.

14. The computer-implemented method according to claim 8, wherein determining the retraction phase timestamp differential comprises:
repeatedly until the first edge of a first edge type is detected:
progressing the print media by one dot line;
determining sensor data corresponding to the sensor from an analog-to-digital converter associated with the sensor,
determining whether the sensor data indicates the first edge of the first edge type;
in a circumstance where the sensor data indicates the first edge of the first edge type:
determining a first timestamp associated with detection of the first edge;

storing the first timestamp associated with detection of the first edge;
repeatedly until the second edge of the first edge type is detected:
progressing the print media by one dot line;
determining second sensor data corresponding to the sensor from the analog-to-digital converter associated with the sensor;
determining whether the sensor data indicates the second edge of the first edge type;
in a circumstance where the second sensor data indicates the second edge of the first edge type:
determining a second timestamp associated with detection of the first edge;
storing the second timestamp associated with detection of the second edge; and
determining the retraction phase timestamp differential from the first timestamp associated with detection of the first edge and the second timestamp associated with detection of the second edge.

15. A computer program product comprising at least one non-transitory computer-readable storage medium having computer program code stored thereon that, in execution with at least one processor, configures the computer program product for:
determining, via a sensor and during a media output phase, an output phase timestamp differential based at least in part on a first edge associated with a first printable portion of a print media and a second edge associated with a second printable portion of the print media;
determining, via the sensor during a media retraction phase, a retraction phase timestamp differential based at least in part on a third edge associated with a third printable portion of the print media and a fourth edge associated with a fourth printable portion of the print media; and
generating a print position compensation based at least in part on the output phase timestamp differential and the retraction phase timestamp differential.

16. The computer program product according to claim 15, wherein determining, via the sensor and during the media output phase, the output phase timestamp differential comprises:
identifying, during the media output phase, a first event timestamp associated with a first edge detection event associated with the first edge;
identifying, during the media output phase, a second event timestamp associated with a second edge detection event associated with the second edge; and
determining the output phase timestamp differential based at least in part on the first event timestamp and the second event timestamp.

17. The computer program product according to claim 15, wherein determining, via the sensor and during the media output phase, the output phase timestamp differential comprises:
detecting, via the sensor, a first edge detection event during the media output phase;
determining, via the sensor, a first event timestamp associated with the first edge detection event;
detecting, via the sensor, a second edge detection event during the media output phase;
determining, via the sensor, a second event timestamp associated with the second edge detection event; and
generating the output phase timestamp differential by subtracting the second event timestamp from the first event timestamp.

18. The computer program product according to claim 15, wherein determining, via the sensor and during the media retraction phase, the retraction phase timestamp differential comprises:
identifying, during the media retraction phase, a first event timestamp associated with a first edge detection event associated with the first edge;
identifying, during the media retraction phase, a second event timestamp associated with a second edge detection event associated with the second edge; and
determining the retraction phase timestamp differential based at least in part on the first event timestamp and the second event timestamp.

19. The computer program product according to claim 15, wherein determining, via the sensor and during the media retraction phase, the retraction phase timestamp differential comprises:
detecting, via the sensor, a first edge detection event during the media retraction phase;
determining, via the sensor, a first event timestamp associated with the first edge detection event;
detecting, via the sensor, a second edge detection event during the media retraction phase;
determining, via the sensor, a second event timestamp associated with the second edge detection event; and
generating the retraction phase timestamp differential by subtracting the second event timestamp from the first event timestamp.

20. The computer program product according to claim 15, wherein generating the print position compensation comprises:
generating a timestamp-based distance value by subtracting the retraction phase timestamp differential from the output phase timestamp differential; and
generating the print position compensation by multiplying the timestamp-based distance value with a print speed.

21. The computer program product according to claim 15, wherein determining the retraction phase timestamp differential comprises:
repeatedly until the first edge of a first edge type is detected:
progressing the print media by one dot line;
determining sensor data corresponding to the sensor from an analog-to-digital converter associated with the sensor,
determining whether the sensor data indicates the first edge of the first edge type;
in a circumstance where the sensor data indicates the first edge of the first edge type:
determining a first timestamp associated with detection of the first edge;
storing the first timestamp associated with detection of the first edge;
repeatedly until the second edge of the first edge type is detected:
progressing the print media by one dot line;
determining second sensor data corresponding to the sensor from the analog-to-digital converter associated with the sensor;
determining whether the sensor data indicates the second edge of the first edge type;
in a circumstance where the second sensor data indicates the second edge of the first edge type:

determining a second timestamp associated with detection of the first edge;

storing the second timestamp associated with detection of the second edge; and determining the retraction phase timestamp differential from the first timestamp associated with detection of the first edge and the second timestamp associated with detection of the second edge.

\* \* \* \* \*